US012393984B2

(12) United States Patent
Soejima

(10) Patent No.: US 12,393,984 B2
(45) Date of Patent: Aug. 19, 2025

(54) SETTLEMENT APPARATUS AND SETTLEMENT METHOD

(71) Applicant: Toshiba Tec Kabushiki Kaisha, Tokyo (JP)

(72) Inventor: Hidetoshi Soejima, Fukuoka Fukuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 63 days.

(21) Appl. No.: 18/328,341

(22) Filed: Jun. 2, 2023

(65) Prior Publication Data
US 2024/0087018 A1 Mar. 14, 2024

(30) Foreign Application Priority Data
Sep. 8, 2022 (JP) .................. 2022-143184

(51) Int. Cl.
*G06Q 40/04* (2012.01)
*G06Q 20/38* (2012.01)

(52) U.S. Cl.
CPC .......... *G06Q 40/04* (2013.01); *G06Q 20/381* (2013.01)

(58) Field of Classification Search
None
See application file for complete search history.

(56) References Cited

U.S. PATENT DOCUMENTS

| | | | |
|---|---|---|---|
| 2002/0087455 A1* | 7/2002 | Tsagarakis | G06Q 30/06 705/64 |
| 2002/0153415 A1* | 10/2002 | Minami | G06Q 20/1085 235/380 |
| 2002/0161707 A1* | 10/2002 | Cole | G06Q 30/06 705/42 |
| 2006/0022032 A1* | 2/2006 | Fillinger | G06Q 40/02 235/379 |
| 2006/0095361 A1* | 5/2006 | Rude | G06Q 40/04 705/37 |
| 2007/0282739 A1* | 12/2007 | Thomsen | G06Q 20/10 705/39 |
| 2008/0301047 A1* | 12/2008 | Fish | G06Q 20/105 705/41 |
| 2009/0112757 A1* | 4/2009 | Hammad | G06Q 30/0212 705/39 |
| 2012/0233073 A1* | 9/2012 | Salmon | G06Q 20/384 705/44 |

(Continued)

FOREIGN PATENT DOCUMENTS

JP 4675700 B2 4/2011

*Primary Examiner* — William J Jacob
(74) *Attorney, Agent, or Firm* — Kim & Stewart LLP

(57) ABSTRACT

According to an embodiment, a settlement apparatus calculates, if a payment amount is an amount of money in a unit of a second currency, the amount of difference between a settlement amount in the unit of the second currency and the payment amount. The settlement apparatus converts the payment amount in the unit of the second currency into the payment amount in a unit of a first currency and computes the amount of difference between the converted payment amount and a settlement amount calculated in the unit of the first currency. Further, the settlement apparatus outputs the amount of difference calculated by second computing means or the amount of difference calculated by second converting means.

8 Claims, 16 Drawing Sheets

(56) References Cited

U.S. PATENT DOCUMENTS

| | | | |
|---|---|---|---|
| 2012/0239556 A1* | 9/2012 | Magruder | G06Q 30/06 |
| | | | 705/39 |
| 2014/0358756 A1* | 12/2014 | Chiu | G06Q 20/10 |
| | | | 705/37 |
| 2015/0379483 A1* | 12/2015 | Sharma | G06Q 20/381 |
| | | | 705/44 |
| 2016/0267452 A1* | 9/2016 | Kim | G06Q 20/12 |
| 2024/0046229 A1* | 2/2024 | Yoon | G06Q 20/381 |

* cited by examiner

| Currency | Conversion rate |
|---|---|
| Dollar | 136 |
| Euro | 138 |
| Pound | 162 |
| Franc | 141 |
| ⋮ | ⋮ |

Fig.3

SETTLEMENT APPARATUS AND SETTLEMENT METHOD

CROSS-REFERENCE TO RELATED APPLICATIONS

This application is based upon and claims the benefit of priority from the prior Japanese Patent Application No. 2022-143184, filed on Sep. 8, 2022, the entire contents of which are incorporated herein by reference.

FIELD

Embodiments described herein generally relate to a settlement apparatus and a settlement method.

BACKGROUND

For example, stores that operate in a place where many foreigners gather, such as an airport, can be expected to attract customers by accepting payment in not only a domestic currency but also foreign currencies. In this regard, there is a demand for a settlement apparatus that handles payment in foreign currencies as well.

BRIEF DESCRIPTION OF THE DRAWINGS

FIG. 3 is a schematic diagram showing an example of a rate table referred to by the settlement apparatus according to the embodiment.

DETAILED DESCRIPTION

Figure 1:
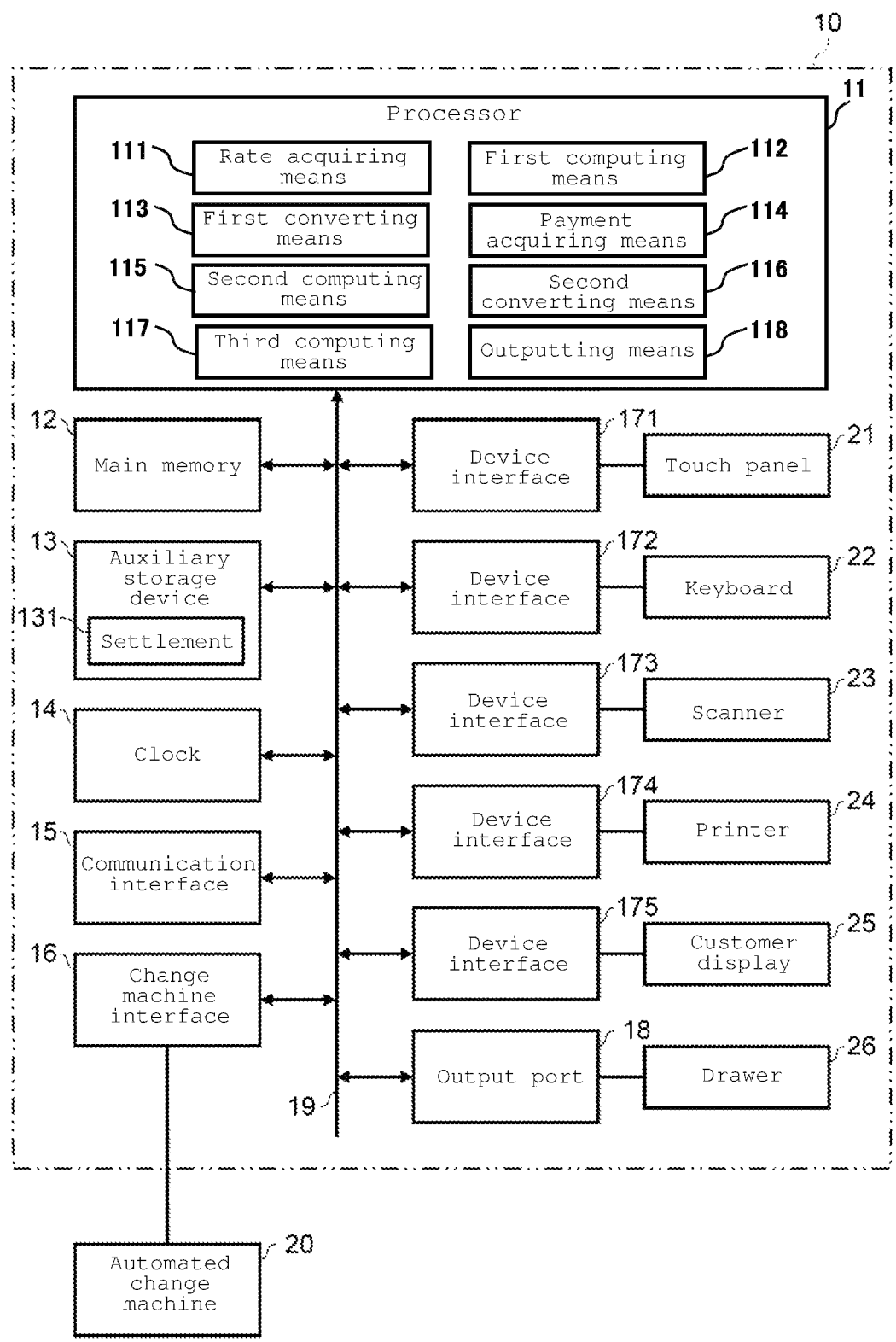
FIG. 1 is a block diagram showing a circuit configuration of a main part of a settlement apparatus according to an embodiment.

According to one embodiment, a settlement apparatus includes a rate table, a first settlement amount memory, a second settlement amount memory, a payment amount memory, a difference amount memory, and a processor. The rate table stores an exchange rate between a first currency and a second currency. The first settlement amount memory stores a settlement amount in a unit of the first currency. The second settlement amount memory stores a settlement amount in a unit of the second currency. The payment amount memory stores a payment amount for the settlement amount. The difference amount memory stores an amount of difference between the settlement amount and the payment amount. The processor refers to the rate table to acquire a rate for exchanging the first currency for the second currency. The processor calculates the settlement amount in the unit of the first currency to store the calculated settlement amount in the unit of the first currency in the first settlement amount memory. The processor converts the settlement amount in the unit of the first currency, which is stored in the first settlement amount memory, into the settlement amount in the unit of the second currency by using the acquired rate, to store the converted settlement amount in the unit of the second currency in the second settlement amount memory. The processor acquires the payment amount for the first settlement amount or the second settlement amount to store the payment amount in the payment amount memory. The processor calculates, if the payment amount stored in the payment amount memory is an amount of money in the unit of the second currency, an amount of difference between the settlement amount in the unit of the second currency, which is stored in the second settlement amount memory, and the payment amount stored in the payment amount memory, to store the calculated amount of difference in the unit of the second currency in the difference amount memory. The processor converts the payment amount in the unit of the second currency, which is stored in the payment amount memory, into the payment amount in the unit of the first currency by using the acquired rate, and compute an amount of difference between the converted payment amount in the unit of the first currency and the settlement amount stored in the first settlement amount memory, to store the computed amount of difference in the unit of the first currency in the difference amount memory. Further, the processor outputs the amount of difference in the unit of the second currency, which is stored in the difference amount memory, or the amount of difference in the unit of the first currency, which is stored in the difference amount memory.

Hereinafter, an embodiment of a settlement apparatus capable of handling payment in foreign currencies as well will be described with reference to the drawings. In the drawings, the same reference symbols represent the same or similar portions.

First Embodiment

FIG. 1 is a block diagram showing a circuit configuration of a main part of a settlement apparatus 10 according to a first embodiment. As shown in the figure, the settlement apparatus 10 includes a processor 11, a main memory 12, an auxiliary storage device 13, a clock 14, a communication interface 15, a change machine interface 16, a plurality of device interfaces 171 to 175, an output port 18, and a system transmission path 19. The system transmission path 19 includes an address bus, a data bus, a control signal line, and the like. The settlement apparatus 10 connects the processor 11 with the main memory 12, the auxiliary storage device 13, the clock 14, the communication interface 15, the change machine interface 16, the plurality of device interfaces 171 to 175, and the output port 18 via the system transmission path 19, thus constituting a computer. The settlement apparatus 10 then connects various devices such as a touch panel 21, a keyboard 22, a scanner 23, a printer 24, and a customer display 25 to the device interfaces 171 to 175, respectively. Further, the settlement apparatus 10 connects a drawer 26 to the output port 18. Note that the devices included in the settlement apparatus 10 are not limited to the devices described above. The settlement apparatus 10 may connect other devices such as a magnetic card reader, an IC card reader/writer, and a pin pad thereto via device interfaces.

The processor 11 corresponds to the central portion of the computer. The processor 11 controls the components to implement various functions as the settlement apparatus 10 according to an operating system or application program. The processor 11 is, for example, a central processing unit (CPU).

The main memory 12 corresponds to the main memory portion of the computer. The main memory 12 includes a non-volatile memory area and a volatile memory area. The main memory 12 stores the operating system or application program in the non-volatile memory area. The main memory 12 may store, in the non-volatile or volatile memory area, data necessary for the processor 11 to perform processing for controlling each component. The processor 11 uses the volatile memory area of the main memory 12 as a work area in which data is appropriately rewritten by the processor 11. The non-volatile memory area is, for example, a read only memory (ROM). The volatile memory area is, for example, a random-access memory (RAM).

The auxiliary storage device 13 corresponds to the auxiliary storage portion of the computer. The auxiliary storage device 13 includes, for example, an electric erasable programmable read-only memory (EEPROM), a hard disk drive (HDD), or a solid-state drive (SSD). The auxiliary storage device 13 stores data used for the processor 11 to perform various kinds of processing, data created in processing performed by the processor 11, and the like. The auxiliary storage device 13 sometimes stores the above-mentioned application program.

The clock 14 measures the date and time. The processor 11 processes the date and time obtained by the clock 14 as the current date and time.

The communication interface 15 is a circuit for performing data communication with an external computer device via a communication network. The external computer device corresponds to, for example, a server that provides services such as commodity management and summarization of sales, or a server that supports settlement by a credit card or electronic money.

The change machine interface 16 is a circuit for performing data communication with an automated change machine 20. The automated change machine 20 has a function of counting the numbers of bills and coins inserted from an inserting port for every denomination of cash and obtaining the inserted amount to output data of the inserted amount to the settlement apparatus 10, and a function of paying out bills and coins corresponding to change from a dispensing port on the basis of change data received from the settlement apparatus 10. In other words, the change machine interface 16 has a function of receiving the inserted amount data from the automated change machine 20 and a function of transmitting the change data to the automated change machine 20.

The device interface 171 is a circuit for performing data communication with the touch panel 21. The touch panel 21 is a display device capable of displaying display elements including letters, symbols, images, and the like on the display. Further, the touch panel 21 is also an input device that detects a touch operation position on the display by a sensor and performs processing on the assumption that a display element of that position has been input.

Figure 2:
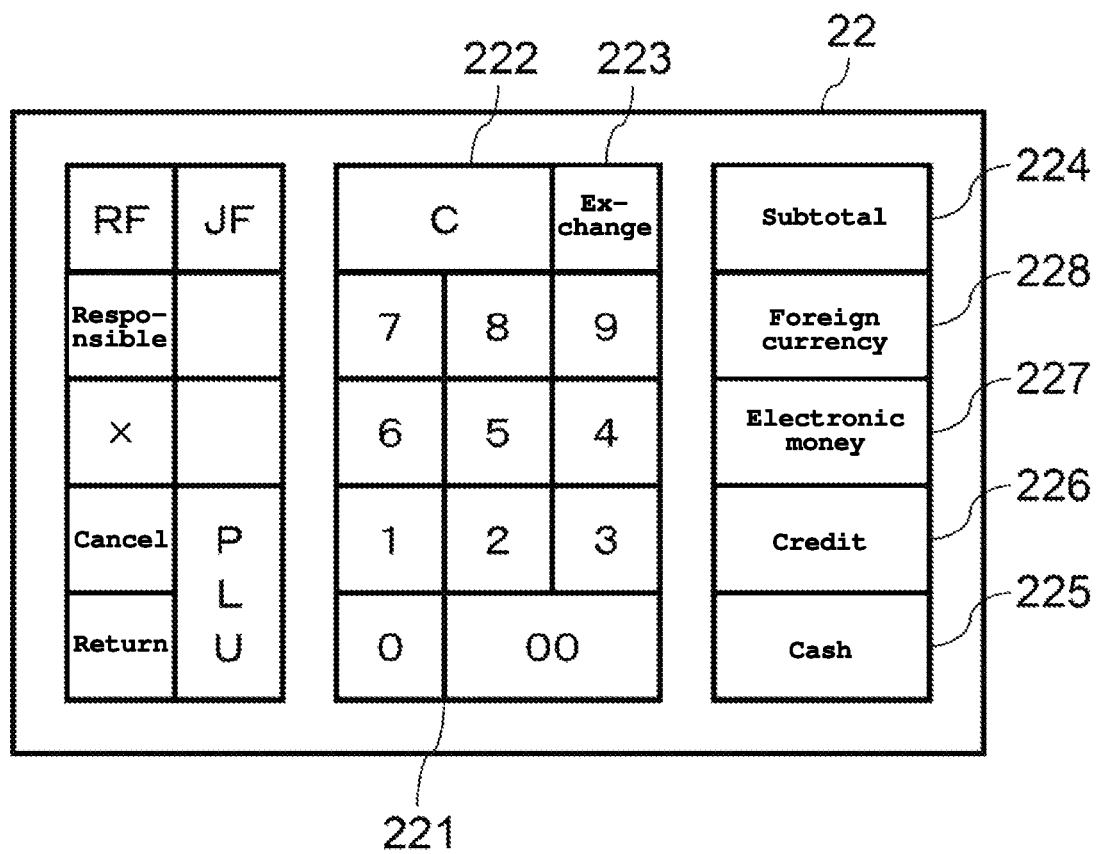
FIG. 2 is a schematic diagram showing a layout of main keys disposed in a keyboard of the settlement apparatus according to the embodiment.

The device interface 172 is a circuit for performing data communication with the keyboard 22. The keyboard 22 is an input device for processing a key signal corresponding to a key operated for input. As shown in FIG. 2, the keyboard 22 includes, in addition to a numeric key 221 for inputting numerical values such as "0" to "9" and "00", various function keys such as a C key 222, an exchange key 223, a subtotal key 224, a cash key 225, a credit key 226, an electronic money key 227, and a foreign currency key 228. The C key 222 is a key for instructing clearing of the numerical values input and displayed at the last minute with the numeric key 221. The exchange key 223 is a key for instructing exchange of money. The subtotal key 224 is a key for instructing output of a subtotal amount. The cash key 225 is a key for instructing settlement in cash. The credit key 226 is a key for instructing settlement by credit card. The electronic money key 227 is a key for instructing settlement by electronic money. The foreign currency key 228 is a key for instructing payment in a foreign currency other than a domestic currency. Incidentally, the "settlement" means that payment for a price of a commodity or compensation of a service is received and a transaction with a customer is closed. Hence, all of the cash key 225, the credit key 226, and the electronic money key 227 can be referred to as close keys.

Referring back to the description of FIG. 1, the device interface 173 is a circuit for performing data communication with the scanner 23. The scanner 23 is an optical input device that reads a machine-readable code such as a bar code or a two-dimensional code by scanning with light. The scanner 23 may be an imaging input device that reads a machine-readable code from an image captured by a camera. The scanner 23 can read not only a machine-readable code attached to a commodity or the like but also a machine-readable code displayed on a display of a terminal such as a smartphone.

The device interface 174 is a circuit for performing data communication with the printer 24. The printer 24 is a printing device that prints data associated with settlement of a transaction on a paper medium and issues a receipt.

The device interface 175 is a circuit for performing data communication with the customer display 25. The customer display 25 is a display device that displays various types of information to a customer as a target person of a transaction settled by the settlement apparatus 10.

The output port 18 is a circuit for outputting an open command signal to the drawer 26. The drawer 26 is for housing not only domestic bills and coins but also foreign bills and coins and the like, and performs an opening operation in response to the open command signal from the output port 18. A close operation is performed manually by an operator.

The settlement apparatus 10 having such a configuration is an electronic apparatus used to receive payment for a price of a commodity purchased in a store or for compensation of a service provided by the store from the customer and to settle the transaction with that customer. In general, the settlement apparatus 10 is referred to as a point-of-sales (POS) terminal, a money register, a checkout machine, or the like. Further, the customer may be put into a target person of a transaction, a payer, a purchaser, a store user, or the like.

The operator of the settlement apparatus 10 is typically a store clerk. There is also a self-service settlement apparatus, the operator of which may be a customer, but in this embodiment, a face-to-face settlement apparatus, the operator of which is a store clerk, will be exemplified. Thus, the touch panel 21 functions as a display for a store clerk. Further, the touch panel 21, the keyboard 22, and the scanner 23 are input devices operable by the store clerk. In particular, the keyboard 22 functions as an input device for inputting the amount of money.

Incidentally, the settlement apparatus 10 includes the foreign currency key 228 in the keyboard 22 so as to be capable of handling payment in not only a domestic currency but also a foreign currency. Here, in this embodiment, it is assumed that the settlement apparatus 10 is used inside Japan. In other words, the domestic currency as a first currency is "yen". The foreign currency as a second currency is, for example, "dollar", "euro", "pound", "franc", "won", or "yuan". The type and number of foreign currencies are not particularly limited.

A conversion rate is used as a rate for exchange between "yen" and a foreign currency. In this regard, the settlement apparatus 10 utilizes a data table in which conversion rates are stored for respective foreign currencies, a so-called rate table 30. The rate table 30 is stored in the main memory 12 or the auxiliary storage device 13. Alternatively, the rate table 30 may be managed on a server connected via the communication interface 15, and the settlement apparatus 10 may access the server when needed. For the conversion rate, for example, a conversion rate used when yen is sold and purchased in foreign exchange markets, a so-called exchange rate (exchange quotation), only needs to be employed.

Figure 4:
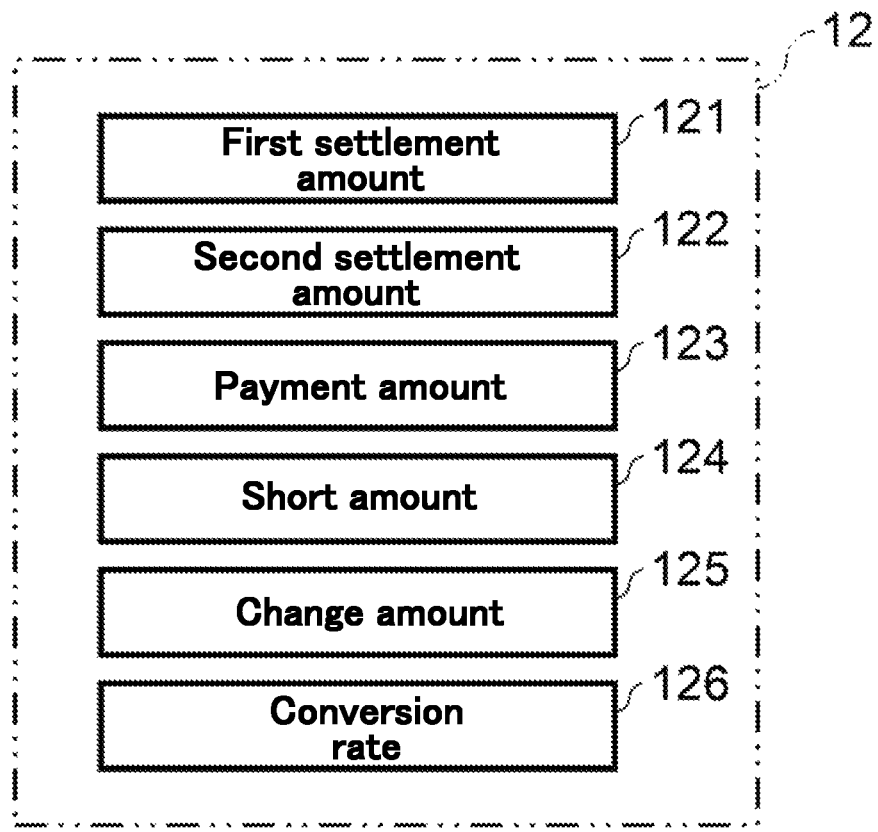
FIG. 4 is a schematic diagram showing a main work area formed in a main memory of the settlement apparatus according to the embodiment.

Further, as shown in FIG. 4, the settlement apparatus 10 includes, as a part of the work area of the main memory 12, a first settlement amount memory 121, a second settlement amount memory 122, a payment amount memory 123, a short amount memory 124, a change amount memory 125, and a conversion rate memory 126. The first settlement amount memory 121 is an area for storing a settlement amount in a unit of a domestic currency, that is, a first settlement amount. The second settlement amount memory 122 is an area for storing a settlement amount in a unit of a foreign currency, that is, a second settlement amount. The payment amount memory 123 is an area for storing a payment amount for the settlement amount. The short amount memory 124 is an area for storing an amount of difference as a short amount when the amount of difference obtained by subtracting the first settlement amount from the payment amount is a negative value or when the amount of difference obtained by subtracting the second settlement amount from the payment amount is a negative value. The change amount memory 125 is an area for storing an amount of difference as a change amount when the amount of difference obtained by subtracting the first settlement amount from the payment amount is zero or a positive value or when the amount of difference obtained by subtracting the second settlement amount from the payment amount is zero or a positive value. The conversion rate memory 126 is an area for storing the conversion rate acquired from the rate table 30.

As shown in FIG. 1, the processor 11 of the settlement apparatus 10 has functions of rate acquiring means 111, first computing means 112, first converting means 113, payment acquiring means 114, second computing means 115, second converting means 116, third computing means 117, and outputting means 118.

The rate acquiring means 111 has a function of acquiring a conversion rate, which is a rate used when exchanging a domestic currency as a first currency for a foreign currency as a second currency. The rate acquiring means 111 acquires a necessary conversion rate by referring to the rate table 30 described above.

The first computing means 112 has a function of calculating a settlement amount in a unit of the first currency. The settlement amount calculated by the first computing means 112, that is, the first settlement amount, is stored in the first settlement amount memory 121.

The first converting means 113 has a function of converting the first settlement amount calculated by the first computing means 112 into a settlement amount in a unit of the second currency by using the rate acquired by the rate acquiring means 111, that is, the conversion rate. The settlement amount converted by the first converting means 113, that is, the second settlement amount, is stored in the second settlement amount memory 122.

The payment acquiring means 114 has a function of acquiring a payment amount for the first settlement amount or the second settlement amount. Specifically, the payment acquiring means 114 acquires an inserted amount of money, which has been inserted into the automated change machine 20, as a payment amount for the first settlement amount. Further, the payment acquiring means 114 acquires numerical values, which have been input by the numeric key 221 of the keyboard 22, as a payment amount for the second settlement amount. The payment amount acquired by the payment acquiring means 114 is stored in the payment amount memory 123.

The second computing means 115 has a function of calculating, if the payment amount acquired by the payment acquiring means 114 is the amount of money in the unit of the second currency, the amount of difference between the second settlement amount and the payment amount. If the amount of difference calculated by the second computing means 115 is a negative value, the amount of difference is stored in the short amount memory 124. If the amount of difference calculated by the second computing means 115 is zero or a positive value, the amount of difference is stored in the change amount memory 125.

The second converting means 116 has a function of converting, if the amount of difference calculated by the second computing means 115 is zero or a positive value, the payment amount in the unit of the second currency into the payment amount in the unit of the first currency by using the rate acquired by the rate acquiring means 111, that is, the conversion rate, to compute the amount of difference between the converted payment amount and the first settlement amount. The amount of difference is stored in the change amount memory 125.

The third computing means 117 has a function of calculating, if the payment amount acquired by the payment acquiring means 114 is the amount of money in the unit of the first currency, the amount of difference between the first settlement amount and the payment amount. If the amount of difference calculated by the third computing means 117 is a negative value, that amount of difference is stored in the short amount memory 124. If the amount of difference calculated by the third computing means 117 is zero or a positive value, that amount of difference is stored in the change amount memory 125.

The outputting means 118 has a function of outputting the amount of difference calculated by the second computing means 115 or the amount of difference calculated by the second converting means 116. Specifically, if the payment amount in the unit of the second currency is smaller than the second settlement amount, the outputting means 118 outputs the amount of difference calculated by the second computing means 115 as a short amount. Further, if the payment amount in the unit of the second currency is equal to or larger than the second settlement amount, the outputting means 118 outputs the amount of difference calculated by the second converting means 116 as a change amount. Specifically, if the payment amount in the unit of the second currency is equal to or larger than the settlement amount in the unit of the second currency, the outputting means 118 outputs a command to pay out the amount of difference calculated by the second converting means 116, as change, to the automated change machine 20.

The functions of the rate acquiring means 111, the first computing means 112, the first converting means 113, the payment acquiring means 114, the second computing means 115, the second converting means 116, the third computing means 117, and the outputting means 118 are implemented by information processing executed by the processor 11 according to a settlement program 131. The settlement program 131 is installed on the auxiliary storage device 13. The settlement program 131 may be installed on the main memory 12. The method of installing the settlement program 131 on the main memory 12 or the auxiliary storage device 13 is not particularly limited. The settlement program 131 can be installed on the main memory 12 or the auxiliary storage device 13 by recording the settlement program 131 on a removable recording medium or distributing the settlement program 131 through communication via a network. The form of the recording medium does not matter as long as the recording medium can store programs and an apparatus can read the programs from the recording medium, like an SD memory card, a USB memory, or the like.

Figure 5:
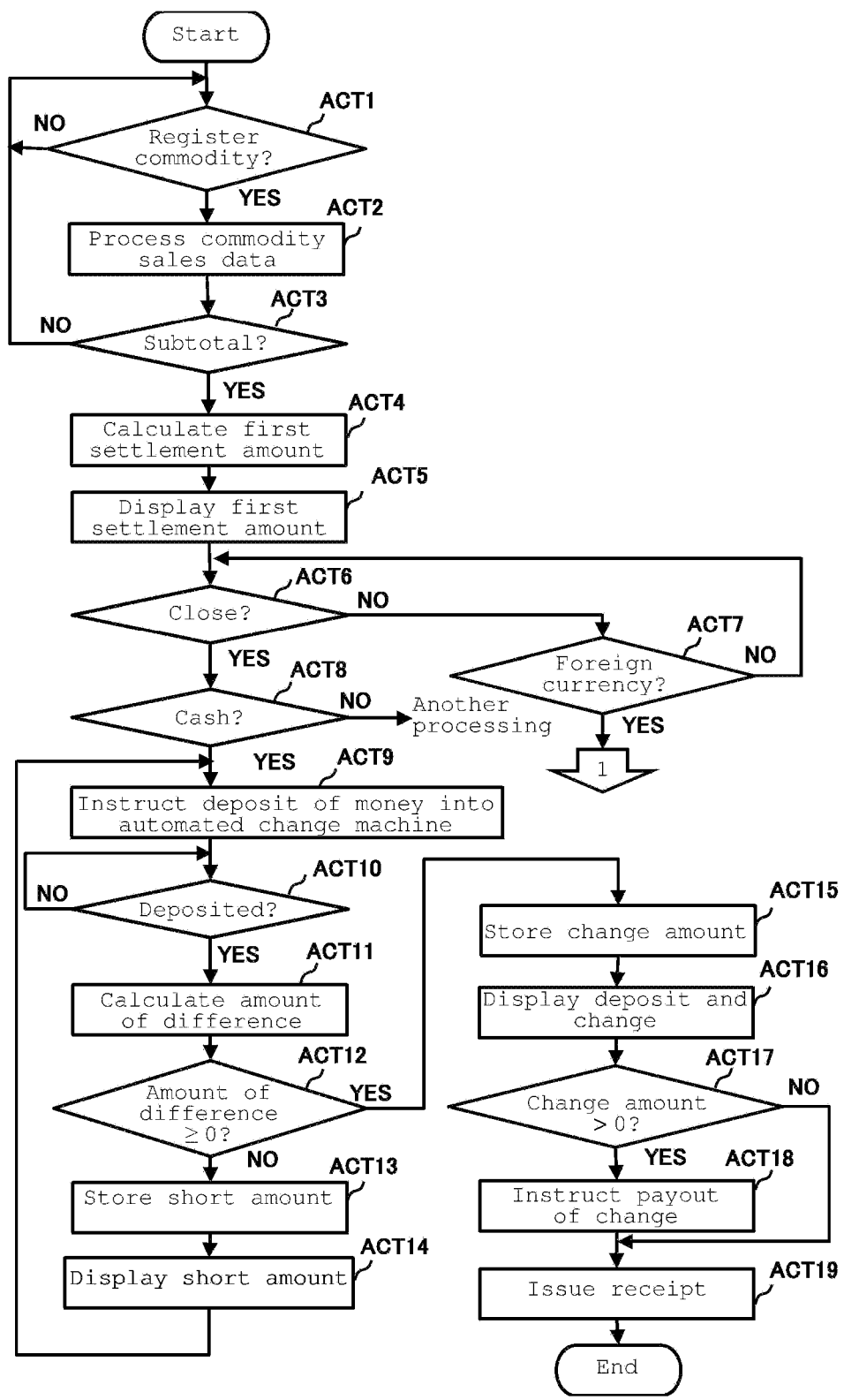
FIG. 5 is a flowchart showing information processing executed by a processor of the settlement apparatus according to the embodiment.
Figure 6:
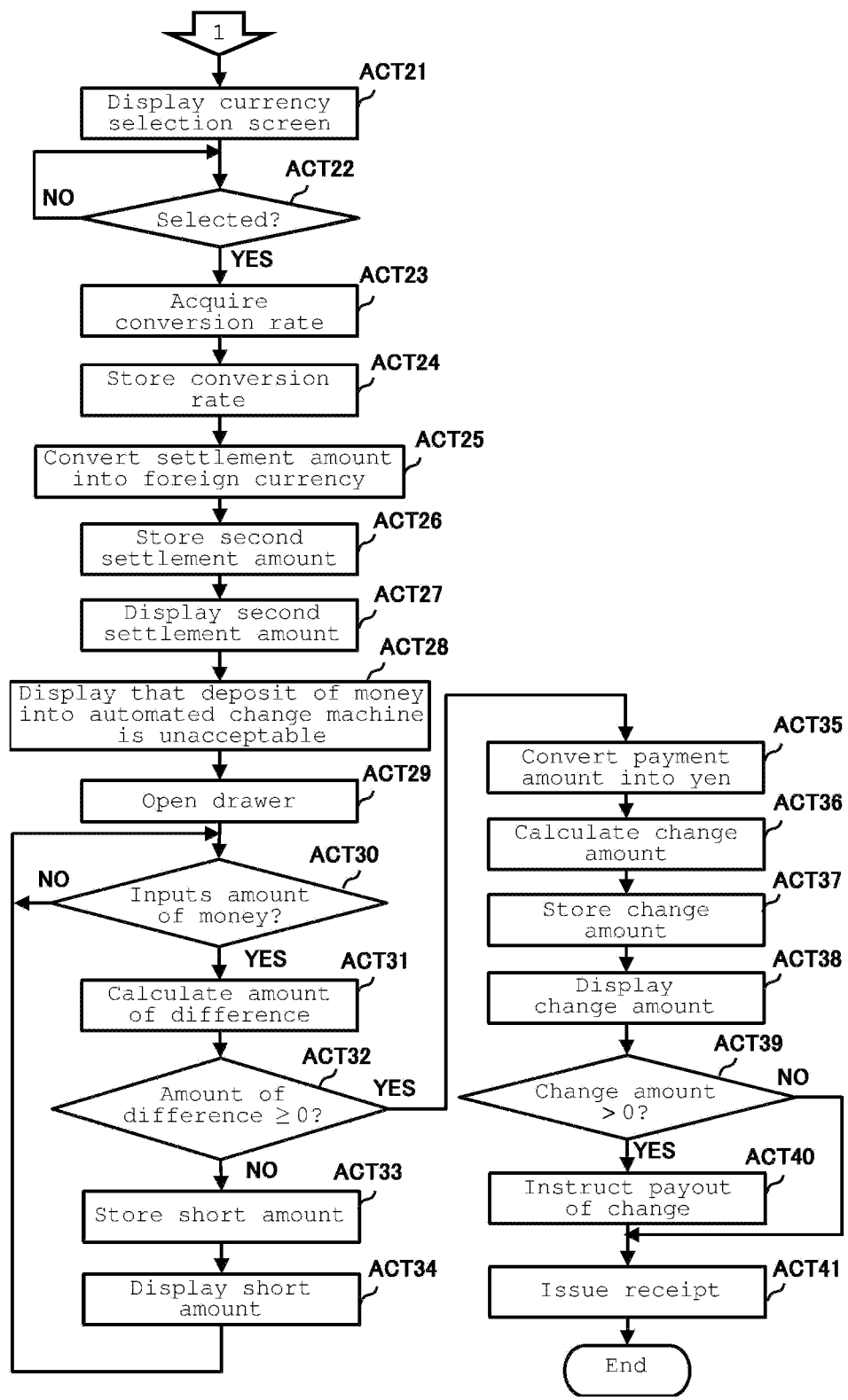
FIG. 6 is a flowchart showing information processing executed by the processor of the settlement apparatus according to the embodiment.

FIGS. 5 and 6 are flowcharts showing the information processing executed by the processor 11 according to the settlement program 131. Further, FIGS. 7 to 10 are exemplary screens, on which images are displayed, of either the touch panel 21 or the customer display 25 or both of them according to the information processing. Hereinafter, a main operation of the settlement apparatus 10 capable of handling payment in a foreign currency as well will be descried with reference to the drawings. Note that the procedures and contents of the information processing to be described later are exemplary ones. The procedures and contents can be appropriately modified if it is possible to provide similar actions and effects. Further, the images displayed on the screens shown in FIGS. 7 to 10 are also examples. The layout, text, and the like of the display elements can be appropriately modified.

First, in ACT1, the processor 11 waits for an operation of registering a commodity. When a store clerk who is an operator of the settlement apparatus 10 is asked to perform checkout by a customer who is a user of the store, the store clerk uses the input device such as the touch panel 21, the keyboard 22, or the scanner 23 to perform an operation for registering a commodity for which the checkout is to be performed. For example, if the commodity is provided with a bar code representing a commodity code, the store clerk performs an operation for reading the bar code with the scanner 23. If the commodity is not provided with a bar code, the store clerk performs an operation for inputting a commodity code with the touch panel 21 or the keyboard 22. Through such operations, the processor 11 determines that the operation of registering a commodity has been performed. The processing of the processor 11 proceeds from ACT1 to ACT2.

In ACT2, the processor 11 executes processing of registering commodity sales data. In other words, the processor 11 writes commodity sales data, which includes a commodity code, a commodity name, a unit price, the number of pieces to be sold, a sales amount, and the like of the commodity for which checkout is to be performed, in a transaction memory. The transaction memory is an area for saving the commodity sales data of one transaction. The transaction memory is formed in, for example, the volatile area of the main memory 12.

When the processing of registering commodity sales data is terminated, the processing of the processor 11 proceeds to ACT3. In ACT3, the processor 11 confirms whether the subtotal key 224 has been operated or not. If the subtotal key 224 has not been operated, the processor 11 returns to ACT1. The processor 11 waits for the next operation of registering a commodity.

If the customer purchases two or more commodities, the store clerk also performs an operation of registering the second and other commodities sequentially. Upon receiving such a registering operation, the processor 11 repeatedly executes the processing of registering commodity sales data. When finishing all the registering operations for the commodities to be purchased by the customer, the store clerk operates the subtotal key 224. After the subtotal key 224 is operated, the processing of the processor 11 proceeds from ACT3 to ACT4. In ACT4, the processor 11 calculates a first settlement amount by the function of the first computing means 112. For example, the processor 11 combines the sales amounts of the commodity sales data saved in the transaction memory to calculate a first settlement amount. The first settlement amount is a settlement amount calculated in a unit of a domestic currency. In other words, in the case of Japan, the first settlement amount is the amount of money in a unit of "yen". The first settlement amount is stored in the first settlement amount memory 121.

After the first settlement amount is calculated, the processing of the processor 11 proceeds to ACT5. In ACT5, the processor 11 causes both the touch panel 21 and the customer display 25 to display the first settlement amount stored in the first settlement amount memory 121.

Figure 7:
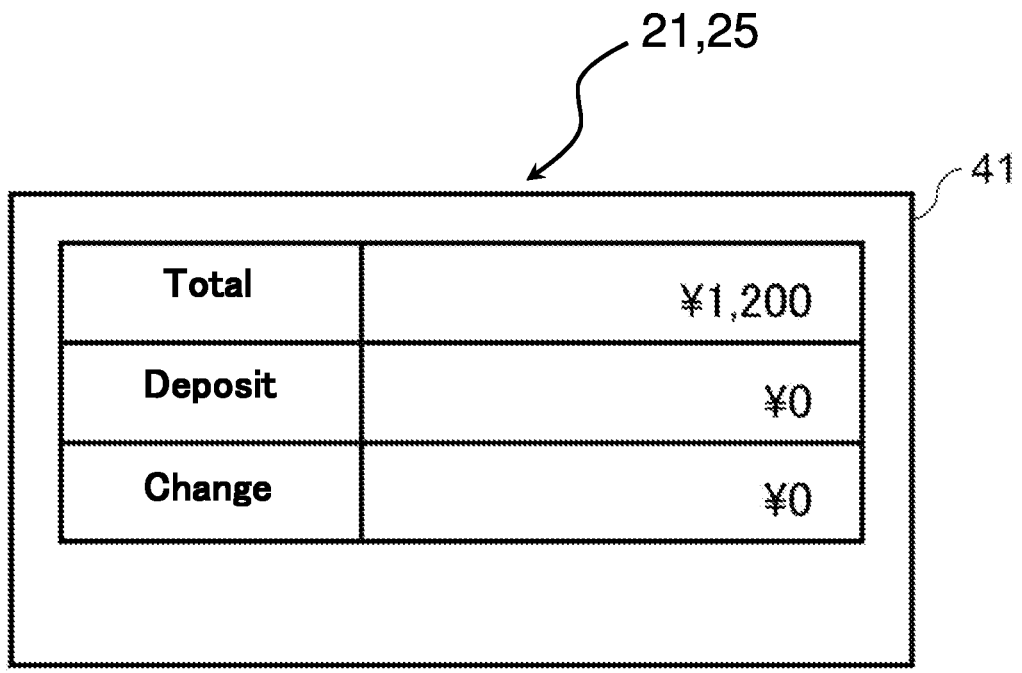
FIG. 7 is a diagram showing an example of a screen, on which an image is displayed, of a touch panel or a customer display of the settlement apparatus according to the embodiment.

FIG. 7 shows an example of a screen of each of the touch panel 21 and the customer display 25, on which an image 41 including the first settlement amount is displayed. In the image 41, the first settlement amount of "¥1,200" in the unit of "yen" is displayed in association with a text "total". For a text "deposit" and a text "change", a deposit amount of "¥0" and a change amount of "¥0" in the unit of "yen" are respectively displayed.

The store clerk confirms the image 41 of the touch panel 21, and then demands payment from the customer. Here, if the customer wants to pay in the domestic currency, the store clerk operates the cash key 225. If the customer wants to pay by a credit card, the store clerk operates the credit key 226. If the customer wants to pay by electronic money, the store clerk operates the electronic money key 227. If the customer wants to pay in a foreign currency, the store clerk operates the foreign currency key 228.

After the first settlement amount is displayed, in ACT6, the processor 11 waits until the close key, that is, the cash key 225, the credit key 226, or the electronic money key 227 is operated, or in ACT7, waits until the foreign currency key 228 is input. In this standby state, if a key other than the close key or the foreign currency key 228 is operated, the processor 11 executes processing corresponding to the operated key.

If the close key is operated in the standby state in ACT6 and ACT7, the processing of the processor 11 proceeds from ACT6 to ACT8. In ACT8, the processor 11 determines the type of the operated close key. For example, if the credit key 226 is operated, the processor 11 executes settlement processing by credit card payment. If the electronic money key 227 is operated, the processor 11 executes settlement processing by electronic money payment. The settlement processing by credit card payment or electronic money payment is known processing, and thus the description thereof will be omitted here.

If the cash key 225 is operated, the processing of the processor 11 proceeds from ACT8 to ACT9. In ACT9, the processor 11 causes the customer display 25 to display an image for instructing a customer to deposit money into the automated change machine 20. For example, the processor 11 causes the customer display 25 to display a message image indicating "Insert money into the automated change machine". The customer confirms the message image and then inserts the money in the domestic currency into a bill inserting port or a coin inserting port of the automated change machine 20. After such an insertion operation, inserted amount data is transmitted from the automated change machine 20 to the settlement apparatus 10.

After the deposit of money is instructed, the processing of the processor 11 proceeds from ACT9 to ACT10. In ACT10, the processor 11 waits for the deposit of the payment amount by the function as the payment acquiring means 114. Specifically, the processor 11 waits until the inserted amount data is transmitted from the automated change machine 20. When receiving the inserted amount data, the processor 11 stores the amount of money obtained from the inserted amount data, as a payment amount in a unit of domestic currency, in the payment amount memory 123. After that, the processing of the processor 11 proceeds to ACT11. In ACT11, the processor 11 calculates the amount of difference, which is obtained by subtracting the first settlement amount stored in the first settlement amount memory 121 from the payment amount stored in the payment amount memory 123, by the function of the third computing means 117. For example, assuming that the payment amount is "A" and the first settlement amount is "B", a difference "C" of "A-B" is defined as the amount of difference.

In ACT12, the processor 11 confirms whether the amount of difference "C" is a negative value, or "0" or a positive value. If the amount of difference "C" is a negative value, the processing of the processor 11 proceeds from ACT12 to ACT13. In ACT13, the processor 11 stores the amount of difference "C" in the short amount memory 124. In ACT14, the processor 11 then causes the touch panel 21 and the customer display 25 to display, as a short amount, the amount of difference "C" stored in the short amount memory 124. For example, the processor 11 causes the touch panel 21 and the customer display 25 to display a message image, "The payment amount is C yen short."

Subsequently, the processing of the processor 11 returns to ACT9. In other words, the processor 11 causes the customer display 25 to display an image for instructing the customer to deposit money into the automated change machine 20. For example, the processor 11 causes the customer display 25 to display a message image, "Insert the short amount of money into the automated change machine." The customer confirms the message image and then inserts the short amount of money or more in the domestic currency into the bill inserting port or the coin inserting port of the automated change machine 20. After such an insertion operation, inserted amount data is transmitted from the automated change machine 20 to the settlement apparatus 10.

After receiving the inserted amount data, the processor 11 adds a payment amount "D" obtained from the inserted amount data to the payment amount memory 123. The processor 11 then calculates again an amount of difference "E", which is obtained by subtracting the first settlement amount "B" from the payment amount "A+D" stored in the payment amount memory 123. Here, if the payment amount D is equal to or larger than the short amount C, the amount of difference "E" is "0" or a positive value, and thus the processing of the processor 11 proceeds from ACT12 to ACT15. In ACT15, the processor 11 stores the amount of difference "E" in the change amount memory 125. Further, in ACT16, the processor 11 causes the touch panel 21 and the customer display 25 to display the amount of money "A+D" of the payment amount memory 123 (that is, deposit amount) and the amount of money "E" of the change amount memory 125 (that is, change amount). For example, the processor 11 causes the touch panel 21 and the customer display 25 to display the amount of money "A+D", which is stored in the payment amount memory 123, in association with the text "deposit" of the image 41 shown in FIG. 7. Further, the processor 11 causes the touch panel 21 and the customer display 25 to display the amount of money "E", which is stored in the change amount memory 125, in association with the text "change" of the image 41.

After the deposit amount and the change amount are displayed, the processor 11 confirms whether the change amount is "0" or a positive value in ACT17. If the change amount is a positive value, the processing of the processor 11 proceeds from ACT17 to ACT18. In ACT18, the processor 11 controls the change machine interface 16 to output change data for instructing the automated change machine 20 to pay out the change. By such control, the change data is transmitted from the change machine interface 16 to the automated change machine 20, and money corresponding to the change amount is paid out from the automated change machine 20. The money is the domestic currency. For example, if the customer inserts a bill of 1000 yen and a coin of 500 yen into the automated change machine 20 for the transaction in the total amount of 1200 yen, a change amount of 300 yen is paid out from the automated change machine 20.

If the processor 11 terminates the processing of ACT18 or skips the processing of ACT18 because the change amount is "0", the processing of the processor 11 proceeds to ACT19. In ACT19, the processor 11 controls the printer 24 to issue a receipt on the basis of the commodity sales data stored in the transaction memory. Through such operations, the processor 11 terminates the processing of one transaction according to the settlement program.

Meanwhile, if the foreign currency key 228 is operated in the standby state in ACT6 and ACT7, the processing of the processor 11 proceeds from ACT7 to ACT21 of FIG. 6. In ACT21, the processor 11 causes the touch panel 21 and the customer display 25 to display an image 42 of a currency selection screen (see FIG. 8).

Figure 8:
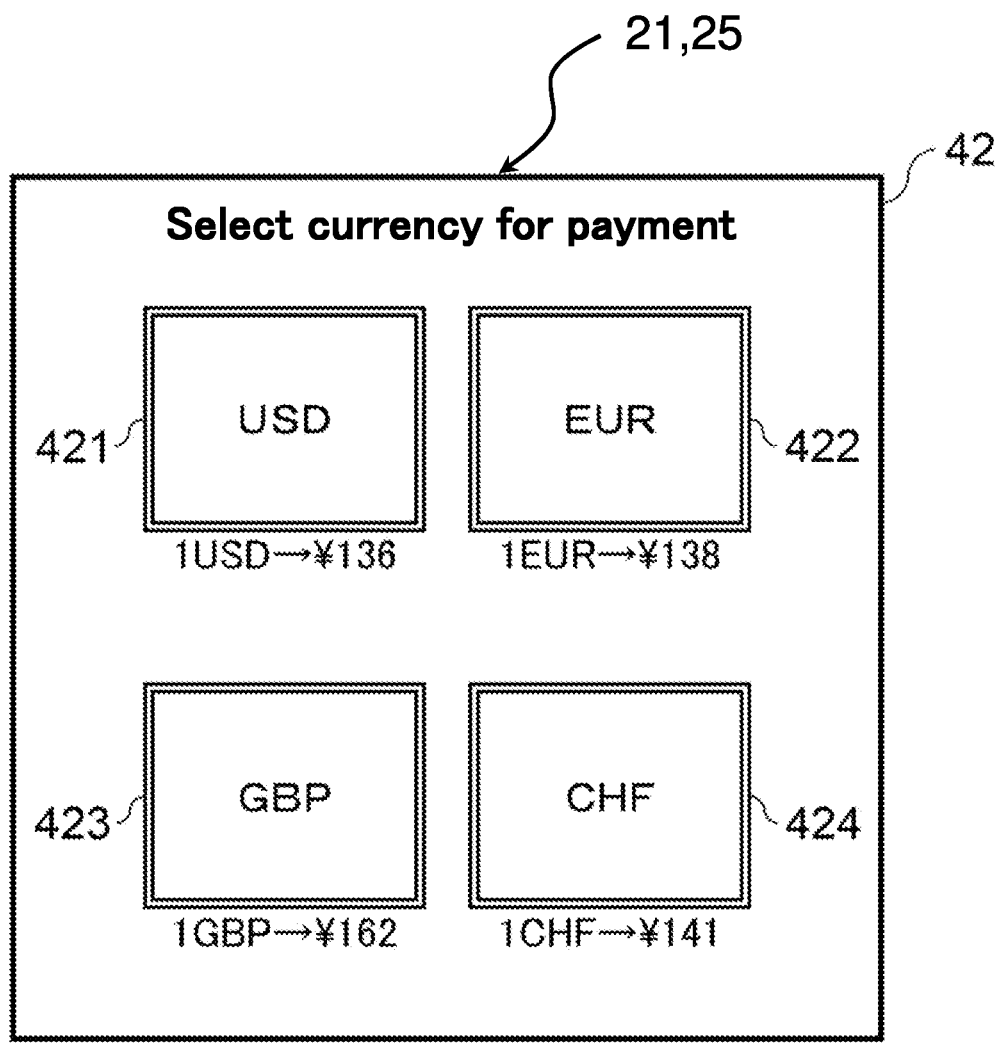
FIG. 8 is a diagram showing an example of a screen, on which an image is displayed, of the touch panel or the customer display of the settlement apparatus according to the embodiment.

FIG. 8 is a display example of an image 42 of a currency selection screen for the touch panel 21 and the customer display 25. The image 42 of the currency selection screen includes soft keys 421 to 424 for selecting a foreign currency. The soft key 421 is a key for selecting US dollar [USD]. Hereinafter, the soft key 421 will be referred to as a dollar key 421. The dollar key 421 displays the amount of money "136 yen" obtained when one dollar is converted into Japanese yen at the conversion rate of the rate table 30. The soft key 422 is a key for selecting euro [EUR]. Hereinafter, the soft key 422 will be referred to as an euro key 422. The euro key 422 displays the amount of money "138 yen" obtained when one euro is converted into Japanese yen at the conversion rate of the rate table 30. The soft key 423 is a key for selecting British pound [GBP]. Hereinafter, the soft key 423 will be referred to as a pound key 423. The pound key 423 displays the amount of money "162 yen" obtained when one pound is converted into Japanese yen at the conversion rate of the rate table 30. The soft key 424 is a key for selecting Swiss franc [CHF]. Hereinafter, the soft key 424 will be referred to as a franc key 424. The franc key 424 displays the amount of money "141 yen" obtained when one franc is converted into Japanese yen at the conversion rate of the rate table 30.

Therefore, the customer can easily understand, from the image 42 of the currency selection screen, the type of a foreign currency available for payment, and the conversion rate of that foreign currency to Japanese yen. Needless to say, the number and type of soft keys included in the image 42 of the currency selection screen are not limited to those shown in FIG. 8. For example, the image 42 may be an image of a currency selection screen further including a soft key for selecting "won" as a currency of South Korea, a soft key for selecting "yuan" as a currency of China, and the like.

After confirming the image 42 of the currency selection screen, the customer then informs the store clerk about a foreign currency to be used for payment. The store clerk touches a soft key corresponding to the foreign currency informed from the customer. For example, for a customer who makes payment in US dollar, the store clerk touches the dollar key 421. For a customer who makes payment in euro, the store clerk touches the euro key 422. The same holds true for a customer who makes payment in pound or franc.

After the image 42 of the currency selection screen is displayed, the processor 11 waits until any foreign currency is selected in ACT22. For example, when detecting that the dollar key 421 is touched, the processor 11 determines that "dollar" is selected as a foreign currency to be used for payment. For example, when detecting that the euro key 422 is touched, the processor 11 determines that "euro" is selected as a foreign currency to be used for payment. The same holds true for a case where the pound key 423 or the franc key 424 is touched.

If a foreign currency is selected, the processing of the processor 11 proceeds from ACT22 to ACT23. In ACT23, the processor 11 refers to the rate table 30 to acquire the conversion rate of the selected currency by the function of the rate acquiring means 111. In ACT24, the processor 11 then stores the acquired conversion rate in the conversion rate memory 126. For example, if the store clerk touches the dollar key 421 because the customer makes payment in US dollar, the conversion rate "136" is stored in the conversion rate memory 126. If the store clerk touches the euro key 422 because the customer makes payment in euro, the conversion rate "138" is stored in the conversion rate memory 126. The same holds true for a case where the pound key 423 or the franc key 424 is touched.

After the conversion rate is stored, in ACT25, the processor 11 converts the first settlement amount stored in the first settlement amount memory 121 at the conversion rate stored in the conversion rate memory 126 to calculate a settlement amount in the selected foreign currency, by the function of the first converting means 113. In ACT26, the processor 11 stores the converted settlement amount in the second settlement amount memory 122. In ACT27, the processor 11 causes both the touch panel 21 and the customer display 25 to display the settlement amount in the foreign currency stored in the second settlement amount memory 122, that is, the second settlement amount.

Figure 9:
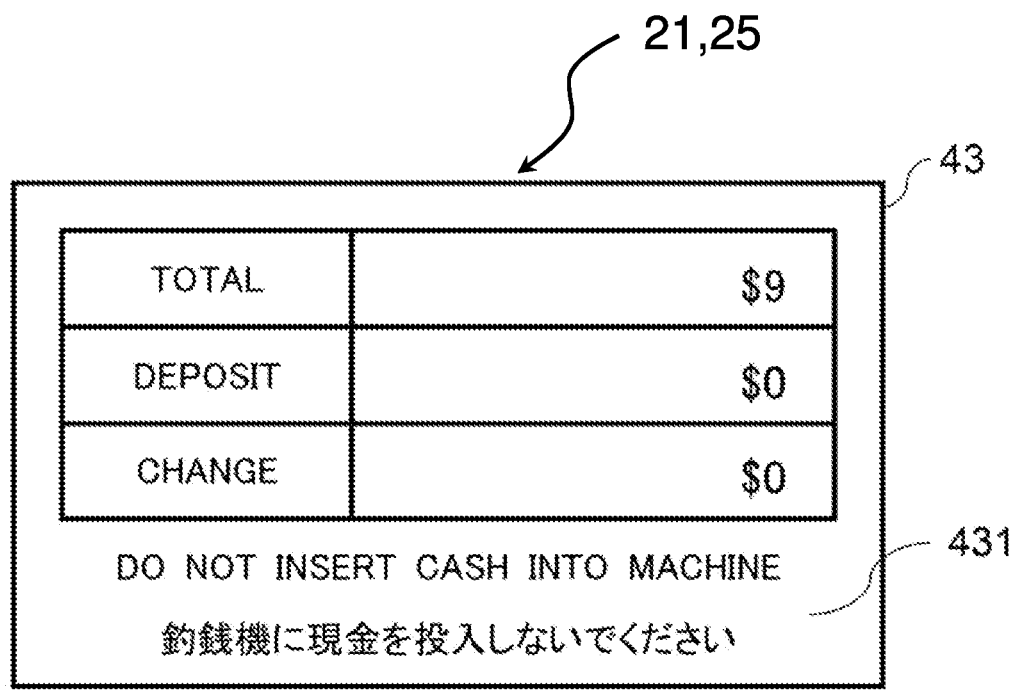
FIG. 9 is a diagram showing an example of a screen, on which an image is displayed, of the touch panel or the customer display of the settlement apparatus according to the embodiment.

FIG. 9 is an example of a screen of the touch panel 21 and the customer display 25, on which an image 43 including the second settlement amount is displayed when the foreign currency "dollar" is selected for payment for the first settlement amount of 1200 yen. Since the conversion rate of "dollar" set in the rate table 30 is "136", the first settlement amount of 1200 yen is approximately 8.82 dollars when it is converted into "dollar", and the second settlement amount of 9 dollars is calculated by rounding up digits after a decimal point. As a result, the image 43 including the second settlement amount of "$9" in the unit of "dollar" is displayed in association with a text "TOTAL" on the screen of the touch panel 21 and the customer display 25. Further, the image 43 including a deposit amount of "$0" and a change amount of "$0" in the unit of "dollar" is displayed in association with a text "DEPOSIT" and a text "CHANGE". By such an image 43 displayed on the screen of the touch panel 21 and the customer display 25, the store clerk and the customer can easily know that 9 dollars are to be paid in the unit of the foreign currency "dollar" for the first settlement amount of 1200 yen calculated in the unit of the domestic currency "yen".

After the second settlement amount of "$9" is displayed, in ACT28, the processor 11 causes the customer display 25 to display an image 431 for notifying the customer of a message indicating that deposit of money into the automated change machine is unacceptable (see FIG. 9). As shown in FIG. 9, the image 431 is an image including a Japanese message, "Do not insert cash into the change machine." and an English message translated from the Japanese message into English.

Incidentally, if the currency in the German-speaking countries is selected as a foreign currency, the message of the image 431 is given not in English but in German. Similarly, if the currency in the French-speaking countries is selected as a foreign currency, the message of the image 431 is given in French. In such a manner, the customer display 25 is caused to display the image 431 of a message for inhibiting the money from being inserted in the official language of the countries or regions where the foreign currency is circulated, so that the customer who selects payment in the foreign currency is prevented from inserting the foreign currency into the automated change machine 20 by mistake.

After the image 431 is displayed, in ACT29, the processor 11 outputs an open command signal to the drawer 26. In ACT30, the processor 11 then waits for the deposit of money in the selected currency by the function of the payment acquiring means 114. When the customer makes payment in the foreign currency, the store clerk inputs the payment amount with the numeric key 221 and operates the cash key 225. For example, if the customer pays 9 dollars in dollar bills, the store clerk inputs "9" and operates the cash key 225 for input. The store clerk houses the dollar bills received from the customer in the drawer 26.

If the payment amount is input, the processing of the processor 11 stores the payment amount in the payment amount memory 123 and then proceeds from ACT30 to ACT31. In ACT31, the processor 11 calculates the amount of difference, which is obtained by subtracting the second settlement amount stored in the second settlement amount memory 122 from the payment amount stored in the payment amount memory 123, by the function of the second computing means 115. For example, assuming that the payment amount is "F" and the second settlement amount is "G", a difference "H" of "F-G" is defined as the amount of difference.

In ACT32, the processor 11 confirms whether the amount of difference "H" is a negative value, or "0" or a positive value. If the amount of difference "H" is a negative value, the processing of the processor 11 proceeds from ACT32 to ACT33. In ACT33, the processor 11 stores the amount of difference "H" in the short amount memory 124. In ACT34, the processor 11 then causes the touch panel 21 and the customer display 25 to display, as a short amount, the amount of difference "H" stored in the short amount memory 124 by the function of the outputting means 118. For example, the processor 11 causes the touch panel 21 and the customer display 25 to display a message image, "The payment amount is H dollars short." In this case as well, the processor 11 causes the touch panel 21 and the customer display 25 to display not only the message in Japanese but alto a message in the official language of the countries or regions where the selected foreign currency is circulated.

Subsequently, the processing of the processor 11 returns to ACT30. In other words, the processor 11 waits for the deposit of money in the selected currency. If a payment amount J in the foreign currency is then input with the numeric key 221 and the cash key 225, the processor 11 adds the payment amount J to the payment amount memory 123. The processor 11 then calculates again an amount of difference "K", which is obtained by subtracting the second settlement amount "G" from the payment amount "F+J" stored in the payment amount memory 123. Here, if the payment amount J is equal to or larger than the short amount H, the amount of difference "K" is "0" or a positive value, and thus the processing of the processor 11 proceeds from ACT32 to ACT35.

In ACT35, the processor 11 uses the conversion rate of the conversion rate memory 126 to convert the payment amount "F+J" in the unit of the foreign currency into the amount of money in the unit of yen, by the function of the second converting means 116. For example, if the payment amount "F+J" is 9 dollars, since the conversion rate of "dollar" set in the rate table 30 is "136", 9 dollars are converted into 1224 yen.

In ACT36, the processor 11 calculates the amount of difference between the converted amount of money and the first settlement amount, that is, the change amount. In ACT37, the processor 11 then stores the change amount in the change amount memory 125. Further, in ACT38, the processor 11 causes the touch panel 21 and the customer display 25 to display the payment amount stored in the payment amount memory 123 in association with the text "DEPOSIT" of the image 43. Further, the processor 11 causes the touch panel 21 and the customer display 25 to display the change amount stored in the change amount memory 125 in association with the text "CHANGE" of the image 43.

Figure 10:
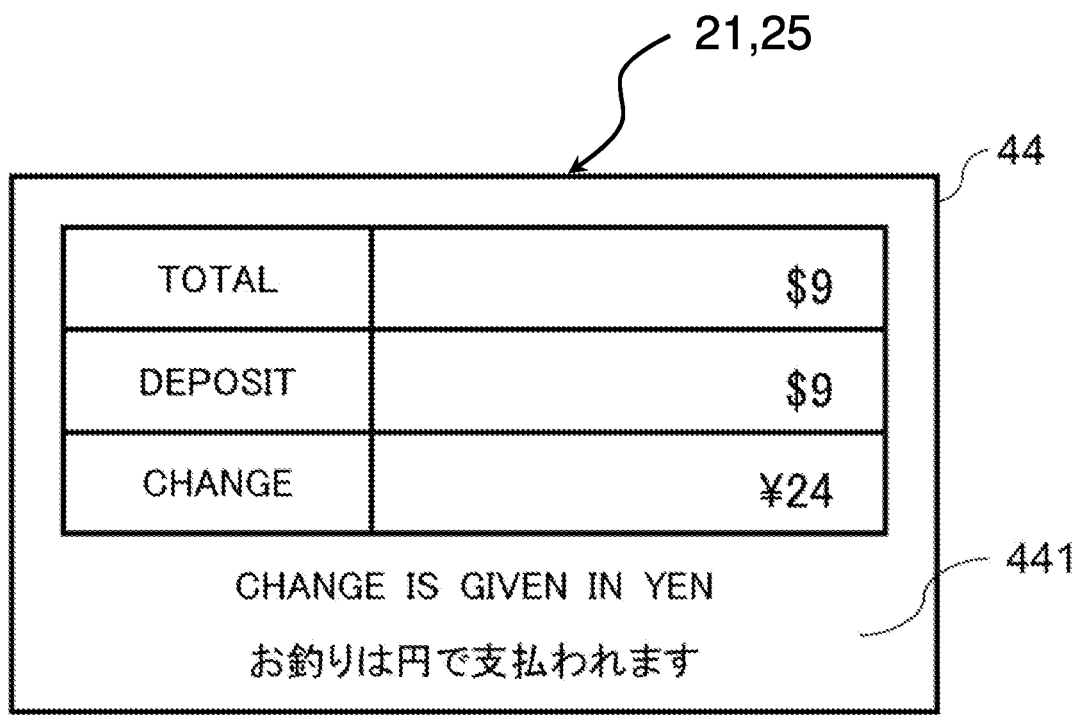
FIG. 10 is a diagram showing an example of a screen, on which an image is displayed, of the touch panel or the customer display of the settlement apparatus according to the embodiment.

FIG. 10 is an example of the screen of the touch panel 21 and the customer display 25 on which an image 44 including the payment amount and the change amount is displayed. As shown in the figure, "$9" is displayed for the text "TOTAL", "$9" is displayed for the text "DEPOSIT", and "¥24" is displayed for the text "CHANGE". The image 44 is displayed on both the touch panel 21 and the customer display 25 together with an image 441 of a message indicating that the change is to be paid in Japanese yen. The image 441 includes the message in Japanese and a message in the official language of the countries or regions where the selected foreign currency is circulated. By such an image 44 displayed on the screen of the touch panel 21, the store clerk can know that the change of 24 yen is to be paid out for the transaction in which 9 dollars have been paid for the settlement amount of 1200 yen. Further, by the image 44 displayed on the screen of the customer display 25, the customer can also know that the change is to be paid in Japanese yen.

After the deposit amount and the change amount are displayed, in ACT39, the processor 11 confirms whether the change amount is "0" or a positive value. If the change amount is a positive value, the processing of the processor 11 proceeds from ACT39 to ACT40. In ACT40, the processor 11 controls the change machine interface 16 to output change data for instructing the automated change machine 20 to pay out the change by the function of the outputting means 118. By such control, the change data is transmitted from the change machine interface 16 to the automated change machine 20, and money corresponding to the change amount is paid out from the automated change machine 20. The money is the domestic currency.

If the processor 11 terminates the processing of ACT40 or skips the processing of ACT40 because the change amount is "0", the processing of the processor 11 proceeds to ACT41. In ACT41, the processor 11 controls the printer 24 to issue a receipt on the basis of the commodity sales data stored in the transaction memory. Through such operations, the processor 11 terminates the processing of one transaction according to the settlement program.

As described above in detail, the settlement apparatus 10 of this embodiment can handle not only the payment in a domestic currency as a first currency but also the payment in a foreign currency as a second currency. Besides, if change is generated for the payment in the foreign currency, the change is paid out in the domestic currency from the automated change machine 20. Therefore, it is unnecessary to pay out the change in the foreign currency, so that the current automated change machine 20 can be utilized as it is.

Second Embodiment

Next, a second embodiment in which a settlement apparatus capable of handling payment in a foreign currency as well is applied to a semi-self-service POS system will be described.

Figure 11:
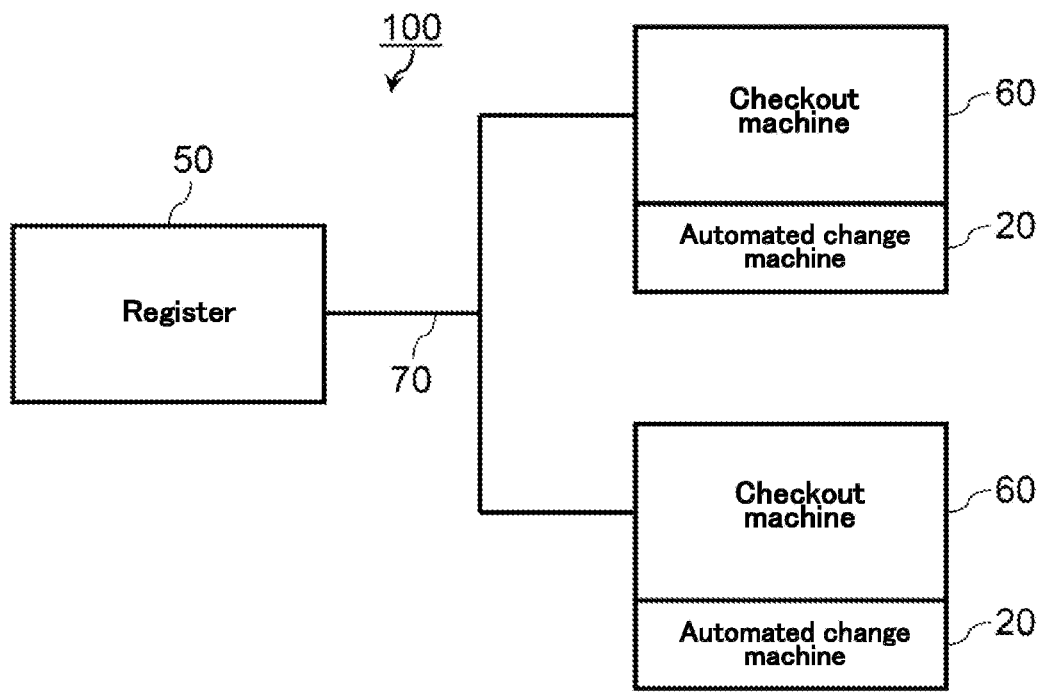
FIG. 11 is a schematic diagram showing the outline of a semi-self-service POS system according to an embodiment.

FIG. 11 is a schematic diagram showing the outline of a semi-self-service POS system 100 according to the second embodiment. The semi-self-service POS system 100 includes one register 50 and two checkout machines 60. The register 50 and each checkout machine 60 are connected to each other via a communication network 70 such as a local area network (LAN). Note that the number of checkout machines 60 is not limited to two. The number of checkout machines 60 may be one or three or more. Further, two or more registers 50 may be connected to one checkout machine 60.

The register 50 is an electronic apparatus that performs processing of registering sales data of a commodity to be purchased by a customer to generate settlement data including a settlement amount for settling a transaction with the customer. The settlement data generated by the register 50 is transmitted to one of the checkout machines 60 connected thereto via the communication network 70. The checkout machine 60 is an electronic apparatus that settles the transaction with the customer on the basis of payment data of the customer for the settlement amount of the settlement data. In the semi-self-service POS system 100 having such a configuration, the register 50 is operated by a store clerk in principle, and the checkout machine 60 is operated by a customer in principle.

Figure 12:
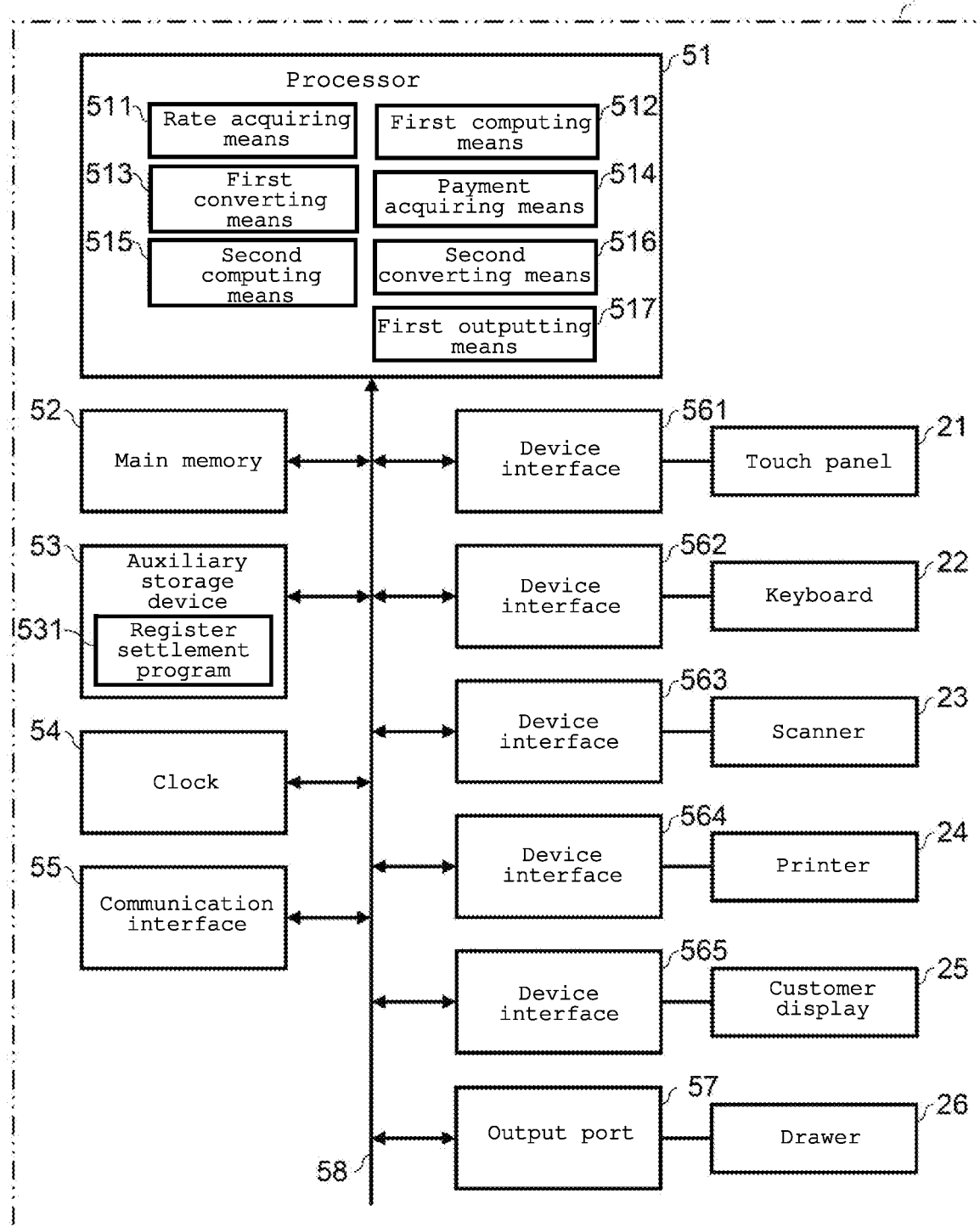
FIG. 12 is a block diagram showing a circuit configuration of a main part of a register in the semi-self-service POS system according to the embodiment.

FIG. 12 is a block diagram showing a circuit configuration of a main part of the register 50. As shown in the figure, the register 50 includes a processor 51, a main memory 52, an auxiliary storage device 53, a clock 54, a communication interface 55, a plurality of device interfaces 561 to 565, an output port 57, and a system transmission path 58. The system transmission path 58 includes an address bus, a data bus, a control signal line, and the like. The register 50 connects the processor 51 with the main memory 52, the auxiliary storage device 53, the clock 54, the communication interface 55, the plurality of device interfaces 561 to 565, and the output port 57 via the system transmission path 58, thus constituting a computer. The register 50 then connects various devices such as a touch panel 21, a keyboard 22, a scanner 23, a printer 24, and a customer display 25 to the device interfaces 561 to 565, respectively, similarly to the settlement apparatus 10 of the first embodiment. Further, the register 50 connects a drawer 26 to the output port 57.

Here, the basic description on the processor 51, the main memory 52, the auxiliary storage device 53, the clock 54, the communication interface 55, the plurality of device interfaces 561 to 565, and the output port 57 is similar to that of the processor 11, the main memory 12, the auxiliary storage device 13, the clock 14, the communication interface 15, the plurality of device interfaces 171 to 175, and the output port 18 of the settlement apparatus 10. Therefore, the description thereof will be omitted here. Note that the communication interface 55 is a circuit for performing data communication with an external computer device via the communication network 70, and such a computer device includes the checkout machine 60.

The register 50 having such a configuration includes, similarly to the settlement apparatus 10, a foreign currency key 228 disposed in the keyboard 22. Further, the register 50 includes, as a part of a work area of the main memory 52, a first settlement amount memory 121, a second settlement amount memory 122, a payment amount memory 123, a short amount memory 124, a change amount memory 125, and a conversion rate memory 126.

The processor 51 of the register 50 has functions of rate acquiring means 511, first computing means 512, first converting means 513, payment acquiring means 514, second computing means 515, second converting means 516, and first outputting means 517.

The rate acquiring means 511 has a function of acquiring a conversion rate, which is a rate used when exchanging a domestic currency as a first currency for a foreign currency as a second currency. The rate acquiring means 511 acquires a necessary conversion rate by referring to the rate table 30, similarly in the first embodiment.

The first computing means 512 has a function of calculating a settlement amount in a unit of the first currency. The settlement amount calculated by the first computing means 512 is stored in the first settlement amount memory 121. In other words, the first settlement amount memory 121 stores the first settlement amount.

The first converting means 513 has a function of converting the first settlement amount calculated by the first computing means 512 into a settlement amount in a unit of the second currency by using the rate acquired by the rate acquiring means 511, that is, the conversion rate. The settlement amount converted by the first converting means 513 is stored in the second settlement amount memory 122. In other words, the second settlement amount memory 122 stores the second settlement amount.

The payment acquiring means 514 has a function of acquiring a payment amount for the second settlement amount. Specifically, after the foreign currency key 228 of the keyboard 22 is operated, the payment acquiring means 514 acquires the amount of money input by the numeric key 221 as a payment amount in the unit of the second currency. The payment amount acquired by the payment acquiring means 114 is stored in the payment amount memory 123. In other words, the payment amount memory 123 stores the payment amount for the second settlement amount.

The second computing means 515 has a function of calculating the amount of difference between the payment amount in the unit of the second currency, which has been acquired by the payment acquiring means 514, and the second settlement amount. If the amount of difference calculated by the second computing means 515 is a negative value, the amount of difference is stored in the short amount memory 124. If the amount of difference calculated by the second computing means 515 is zero or a positive value, the amount of difference is stored in the change amount memory 125. In other words, the short amount memory 124 stores a short amount, and the change amount memory 125 stores a change amount. The second converting means 516 uses the conversion rate of the conversion rate memory 126 to convert the payment amount in the unit of the foreign currency into the amount of money in the unit of yen.

The first outputting means 517 has a function of outputting settlement data including the first settlement amount and the change amount to the checkout machine 60 if the payment amount in the unit of the second currency, which has been acquired by the payment acquiring means 514, is larger than the second settlement amount.

The functions of the rate acquiring means 511, the first computing means 512, the first converting means 513, the payment acquiring means 514, the second computing means 515, the second converting means 516, and the first outputting means 517 are implemented by information processing executed by the processor 51 according to a register settlement program 531. The register settlement program 531 is installed on the auxiliary storage device 53. The register settlement program 531 may be installed on the main memory 52. The method of installing the register settlement program 531 on the main memory 52 or the auxiliary storage device 53 is not particularly limited. The register settlement program 531 can be installed on the main memory 52 or the auxiliary storage device 53 by recording the register settlement program 531 on a removable recording medium or distributing the register settlement program 531 through communication via a network. The form of the recording medium does not matter as long as the recording medium can store programs and an apparatus can read the programs from the recording medium, like an SD memory card, a USB memory, or the like.

Figure 13:
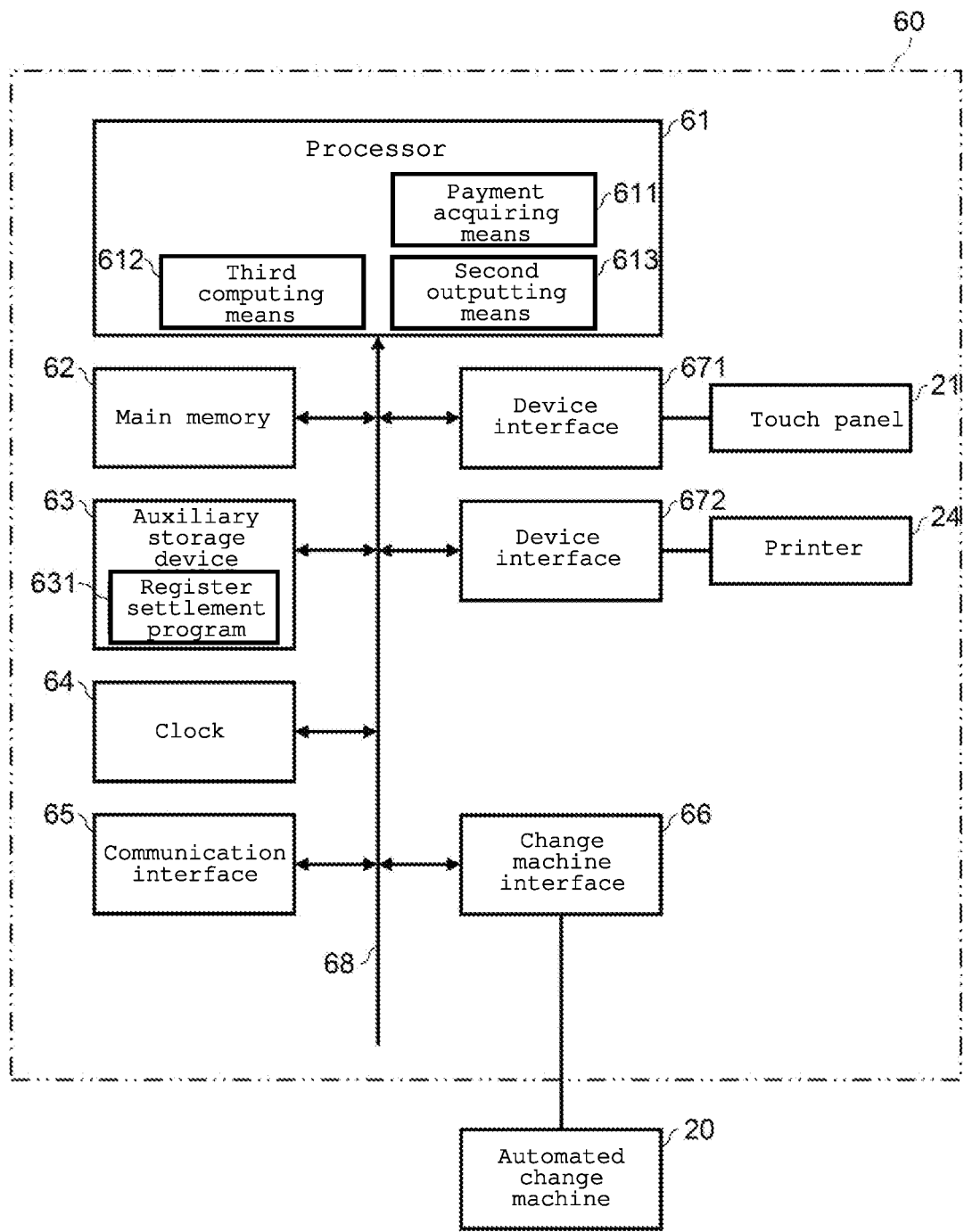
FIG. 13 is a block diagram showing a circuit configuration of a main part of a checkout machine in the semi-self-service POS system according to the embodiment.

FIG. 13 is a block diagram showing a circuit configuration of a main part of the checkout machine 60. As shown in the figure, the checkout machine 60 includes a processor 61, a main memory 62, an auxiliary storage device 63, a clock 64, a communication interface 65, a change machine interface 66, a plurality of device interfaces 671 and 672, and a system transmission path 68. The system transmission path 68 includes an address bus, a data bus, a control signal line, and the like. The checkout machine 60 connects the processor 61 with the main memory 62, the auxiliary storage device 63, the clock 64, the communication interface 65, the change machine interface 66, and the plurality of device interfaces 671 and 672 via the system transmission path 68, thus constituting a computer. The checkout machine 60 then connects a touch panel 21 to the device interface 671 and connects a printer 24 to the device interface 671.

Here, the basic description on the processor 61, the main memory 62, the auxiliary storage device 63, the clock 64, the communication interface 65, the change machine interface 66, and the plurality of device interfaces 671 and 672 is similar to that of the processor 11, the main memory 12, the auxiliary storage device 13, the clock 14, the communication interface 15, the change machine interface 16, and the plurality of device interfaces 171 to 175 of the settlement apparatus 10. Therefore, the description thereof will be omitted here. Note that the communication interface 65 is a circuit for performing data communication with an external computer device via the communication network 70, and such a computer device includes the register 50.

In the checkout machine 60 having such a configuration, the processor 61 has functions of payment acquiring means 611, third computing means 612, and second outputting means 613.

The payment acquiring means 611 has a function of acquiring a payment amount for the first settlement amount included in the settlement data received from the register 50. Specifically, the payment acquiring means 611 acquires the inserted amount of money, which has been inserted into the automated change machine 20, as a payment amount for the first settlement amount.

The third computing means 612 has a function of calculating the amount of difference between the payment amount, which has been acquired by the payment acquiring means 611, and the first settlement amount included in the settlement data received from the register 50.

The second outputting means 613 has a function of outputting a command to pay out the amount of difference calculated by the third computing means 612, as change, to the automated change machine 20. Further, the second outputting means 613 also has a function of outputting a command to pay out change corresponding to the change amount included in the settlement data received from the register 50, to the automated change machine 20.

The functions of the payment acquiring means 611, the third computing means 612, and the second outputting means 613 are implemented by information processing executed by the processor 61 according to a checkout machine settlement program 631. The checkout machine settlement program 631 is installed on the auxiliary storage device 63. The checkout machine settlement program 631 may be installed on the main memory 62. The method of installing the checkout machine settlement program 631 on the main memory 62 or the auxiliary storage device 63 is not particularly limited. The checkout machine settlement program 631 can be installed on the main memory 62 or the auxiliary storage device 63 by recording the checkout machine settlement program 631 on a removable recording medium or distributing the checkout machine settlement program 631 through communication via a network. The form of the recording medium does not matter as long as the recording medium can store programs and an apparatus can read the programs from the recording medium, like an SD memory card, a USB memory, or the like.

Figure 14:
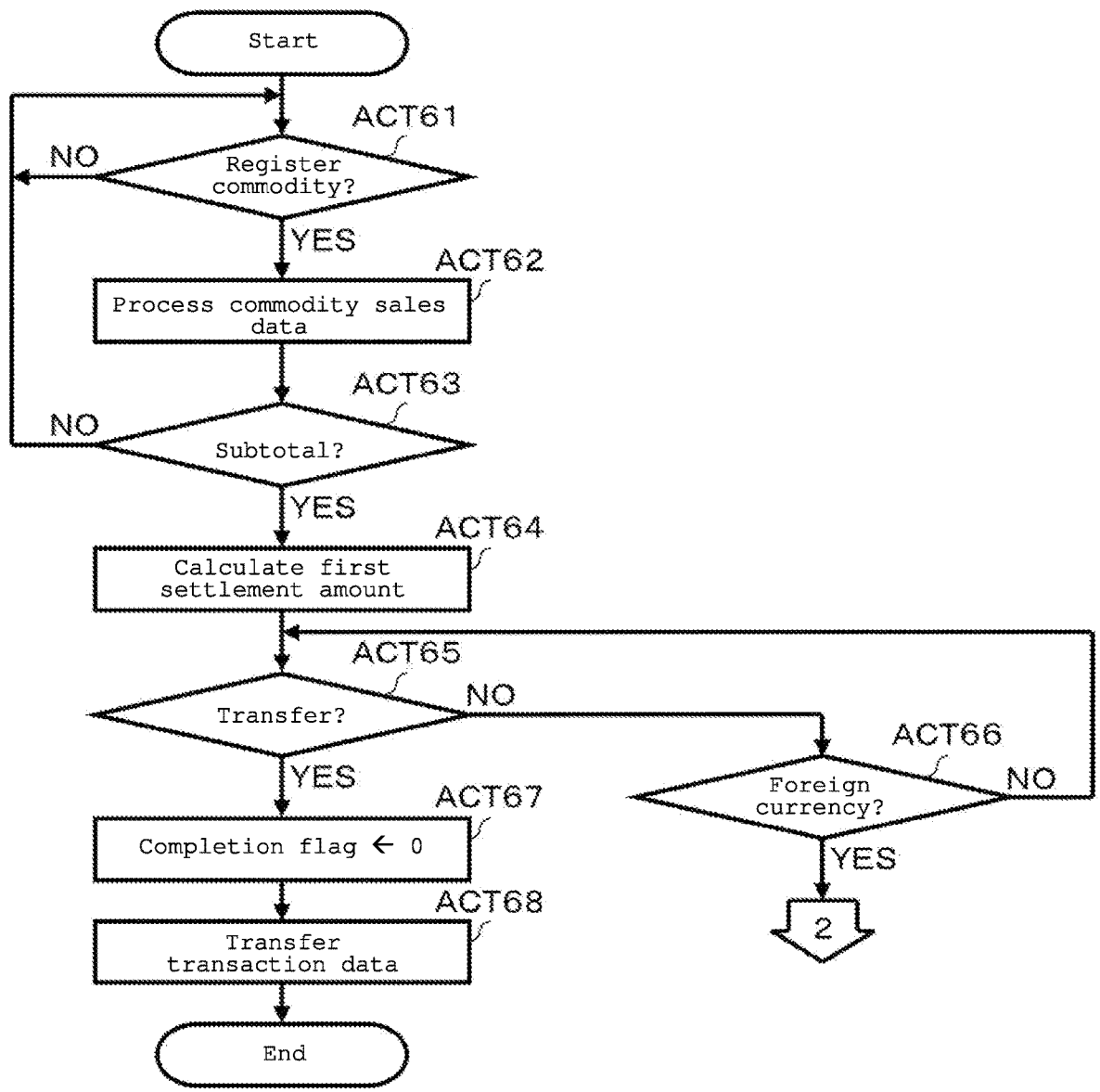
FIG. 14 is a flowchart showing information processing executed by a processor of the register according to the embodiment.
Figure 15:
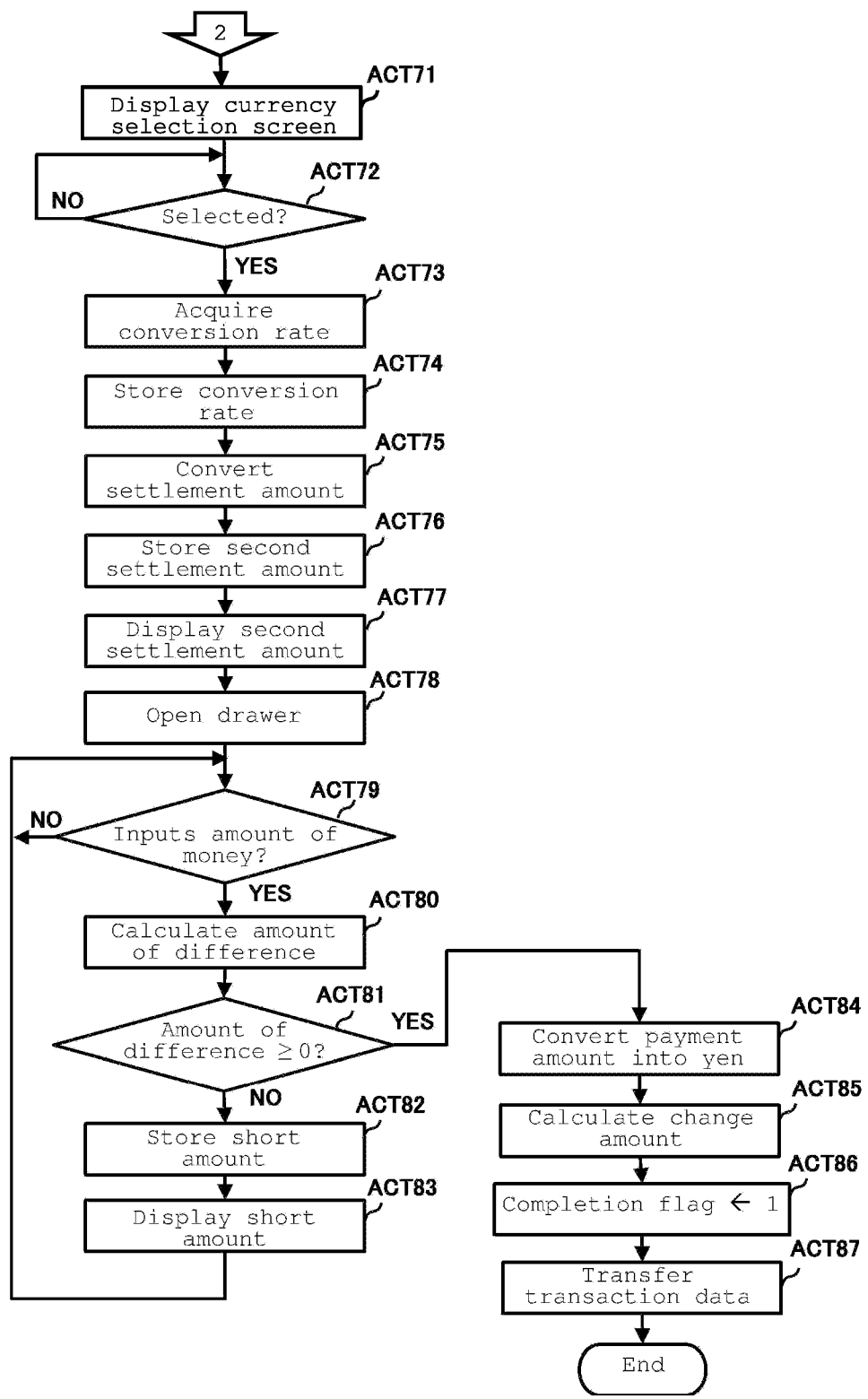
FIG. 15 is a flowchart showing information processing executed by the processor of the register according to the embodiment.
Figure 16:
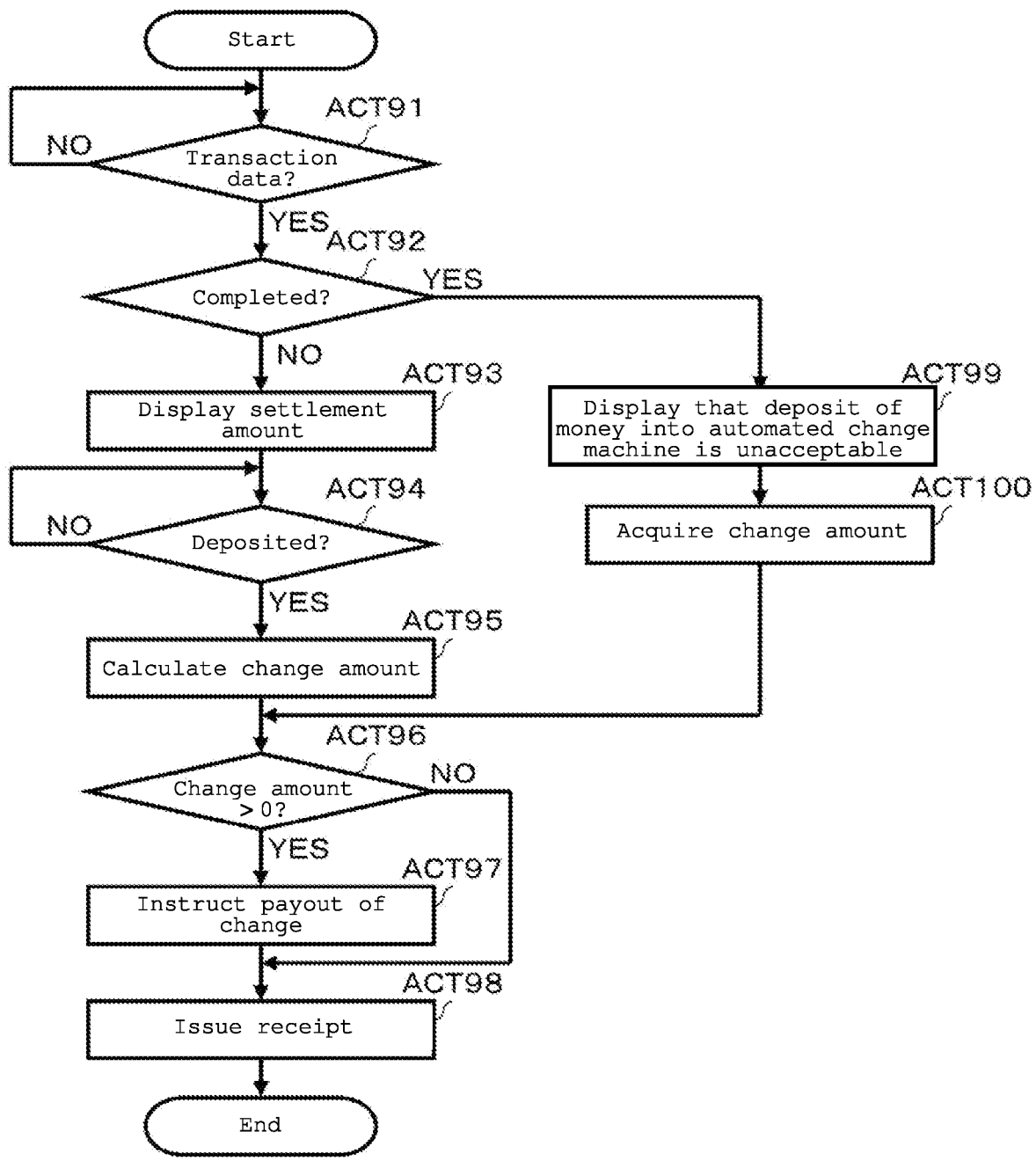
FIG. 16 is a flowchart showing information processing executed by a processor of the checkout machine according to the embodiment.

FIGS. 14 and 15 are flowcharts showing the information processing executed by the processor 51 of the register 50 according to the register settlement program 531. Further, FIG. 16 is a flowchart showing the information processing executed by the processor 61 of the checkout machine 60 according to the checkout machine settlement program 631. Hereinafter, a main operation of the semi-self-service POS system 100 capable of handling payment in a foreign currency as well will be described with reference to those drawings. Note that the procedures and contents of the information processing to be described below are exemplary ones. Those procedures and contents can be appropriately modified if it is possible to provide similar actions and effects.

First, in ACT61, the processor 51 waits for an operation of registering a commodity. When a store clerk who is an operator of the register 50 is asked to perform checkout by a customer who is a user of the store, similarly in the first embodiment, the store clerk uses the input device such as the touch panel 21, the keyboard 22, or the scanner 23 to perform an operation for registering a commodity for which the checkout is to be performed. Through such an operation, the processor 51 determines that the operation of registering a commodity has been performed. The processing of the processor 51 proceeds from ACT61 to ACT62.

In ACT62, the processor 51 executes processing of registering commodity sales data. Such registering processing is also similar to the processing executed by the processor 11 of the settlement apparatus 10 in ACT2 in the first embodiment. When the processing of registering commodity sales data is terminated, the processing of the processor 51 proceeds to ACT63. In ACT63, the processor 51 confirms whether a subtotal key 224 has been operated or not. If the subtotal key 224 has not been operated, the processing of the processor 51 returns to ACT61. The processor 51 waits for the next operation of registering a commodity.

After the subtotal key 224 is operated, the processing of the processor 51 proceeds from ACT63 to ACT64. In ACT64, the processor 51 calculates a first settlement amount by the function of the first computing means 512. The first settlement amount is a settlement amount calculated in a unit of a domestic currency. In other words, in the case of Japan, the first settlement amount is the amount of money in a unit of "yen". The first settlement amount is stored in the first settlement amount memory 121.

After the first settlement amount is calculated, the processing of the processor 51 proceeds to ACT65. In ACT65, the processor 51 confirms whether the transfer of the settlement data has been instructed or not. For example, the touch panel 21 includes a soft key for instructing the transfer of the settlement data, a so-called transfer key. If the customer wants to make payment in the domestic currency as a first currency, the store clerk operates the transfer key. Meanwhile, if the customer wants to make payment in a foreign currency as a second currency, the store clerk operates a foreign currency key 228. Note that the transfer key may be a hard key disposed in the keyboard 22. Similarly, the foreign currency key 228 may be a soft key displayed on the touch panel 21.

In ACT65, if the transfer of the settlement data has not been instructed, the processing of the processor 51 proceeds to ACT66. In ACT66, the processor 51 confirms whether the foreign currency key 228 has been operated for input. If the foreign currency key 228 has not been operated, the processing of the processor 51 returns to ACT65. In such a manner, in ACT65 and ACT66, the processor 51 waits until the transfer key is operated or the foreign currency key 228 is operated.

If the transfer key is operated in the standby state in ACT65 And ACT66, the processing of the processor 51 proceeds from ACT65 to ACT67. In ACT67, the processor 51 sets a completion flag to "0". After that, in ACT68, the processor 51 transfers transaction data to the checkout machine 60. The transaction data is data including the commodity sales data subjected to the registering processing in ACT62, the first settlement amount calculated in the processing of ACT64, and the completion flag set to "0" in the processing of ACT67. The transaction data is transmitted to the checkout machine 60 via the communication network 70.

If the foreign currency key 228 is operated in the standby state in ACT65 And ACT66, the processing of the processor 51 proceeds from ACT66 to ACT71 of FIG. 15. In ACT71, the processor 51 causes the touch panel 21 to display an image 42 of a currency selection screen (see FIG. 8). In ACT72 to ACT77, the processor 51 then executes processing similar to the processing in ACT22 to ACT27 described in the first embodiment.

In other words, after the image 42 of the currency selection screen is displayed, the processor 51 waits until any foreign currency is selected in ACT72. If a foreign currency is selected by the operation of the store clerk, the processing of the processor 51 proceeds from ACT72 to ACT73. In ACT73, the processor 11 refers to the rate table 30 to acquire a conversion rate of the selected currency by the function of the rate acquiring means 511. In ACT74, the processor 51 then stores the acquired conversion rate in the conversion rate memory 126. In ACT75, the processor 51 converts the first settlement amount stored in the first settlement amount memory 121 at the conversion rate stored in the conversion rate memory 126 to calculate a settlement amount in the selected foreign currency, by the function of the first converting means 513. In ACT76, the processor 51 stores the converted settlement amount in the second settlement amount memory 122. In ACT77, the processor 51 causes both the touch panel 21 and the customer display 25 to display the settlement amount in the unit of the foreign currency, which is stored in the second settlement amount memory 122, that is, a second settlement amount.

After the second settlement amount is displayed, in ACT78, the processor 51 outputs an open command signal to the drawer 26. In ACT79, the processor 51 then waits for an input of the payment amount in the selected currency by the function of the payment acquiring means 514. If the customer makes payment in the foreign currency, the store clerk inputs the payment amount with the numeric key 221 and operates the cash key 225.

If the payment amount is input, the processor 51 stores the payment amount in the payment amount memory 123. After that, the processing of the processor 51 proceeds from ACT79 to ACT80. In ACT80, the processor 51 calculates the amount of difference, which is obtained by subtracting the second settlement amount stored in the second settlement amount memory 122 from the payment amount stored in the payment amount memory 123, by the function of the second computing means 515.

In ACT81, the processor 51 confirms whether the amount of difference is a negative value, or "0" or a positive value. If the amount of difference is a negative value, the processing of the processor 51 proceeds from ACT81 to ACT82. In ACT82, the processor 51 stores the amount of difference in the short amount memory 124. In ACT83, the processor 51 then causes the touch panel 21 and the customer display 25 to display, as a short amount, the amount of difference stored in the short amount memory 124.

Subsequently, the processing of the processor 51 returns to ACT79. In other words, the processor 51 waits for the deposit of money in the selected currency. If a payment amount in the foreign currency is then input with the numeric key 221 and the cash key 225, the processor 51 adds the payment amount to the payment amount memory 123. The processor 51 then calculates again the amount of difference, which is obtained by subtracting the second settlement amount from the payment amount stored in the payment amount memory 123. Here, if the payment amount is equal to or larger than the second settlement amount, the amount of difference is "0" or a positive value, and thus the processing of the processor 51 proceeds from ACT81 to ACT84.

In ACT84, the processor 51 uses the conversion rate of the conversion rate memory 126 to convert the payment amount in the unit of the foreign currency into the amount of money in the unit of yen, by the function of the second converting means 516. Subsequently, in ACT85, the processor 51 calculates the amount of difference, which is obtained by subtracting the first settlement amount from the converted payment amount, as a change amount.

In ACT86, the processor 51 sets the completion flag to "1". After that, in ACT87, the processor 51 transfers transaction data to the checkout machine 60. The transaction data is data including the commodity sales data subjected to the registering processing in ACT62, the second settlement amount stored in the processing of ACT76, the change amount calculated in the processing of ACT85, and the completion flag set to "1" in the processing of ACT86. The transaction data is transmitted to the checkout machine 60 via the communication network 70. Through such operations, the processor 51 then terminates the processing of one transaction according to the register settlement program.

As shown in FIG. 16, in ACT91, the processor 61 of the checkout machine 60 waits for the transaction data. Upon receiving the transaction data from the register 50, the processing of the processor 61 proceeds from ACT91 to ACT92. In ACT92, the processor 61 examines the completion flag included in the received transaction data.

If the completion flag is "0", the customer wants to make payment in the domestic currency, and thus the settlement is not completed. The processing of the processor 61 proceeds from ACT92 to ACT93. In ACT93, the processor 61 causes the touch panel 21 to display the first settlement amount included in the transaction data. In ACT94, the processor 61 then waits for deposit of the payment amount by the function of the payment acquiring means 611. Specifically, the processor 61 waits until inserted amount data is transmitted from the automated change machine 20. If the inserted amount data equal to or larger than the first settlement amount is received, the processing of the processor 61 proceeds from ACT94 to ACT95. In ACT95, the processor 61 calculates a change amount by subtracting the first settlement amount from the amount of money inserted into the automated change machine 20.

In ACT96, the processor 61 confirms whether the change amount is "0" or a positive value. If the change amount is a positive value, the processing of the processor 61 proceeds from ACT96 to ACT97. In ACT97, the processor 61 controls the change machine interface 66 to output change data for instructing the automated change machine 20 to pay out the change. By such control, the change data is transmitted from the change machine interface 66 to the automated change machine 20, and money corresponding to the change amount is paid out from the automated change machine 20. The money is the domestic currency.

If the processor 61 terminates the processing of ACT97 or skips the processing of ACT97 because the change amount is "0", the processing of the processor 61 proceeds to ACT98. In ACT98, the processor 61 controls the printer 24 to issue a receipt on the basis of the commodity sales data included in the transaction data. Through such operations, the processor 61 terminates the processing when the transaction data with the completion flag of "0" is received.

Meanwhile, if the completion flag is "1" in ACT92, the customer wants to make payment in the foreign currency, and thus the settlement is completed in the register 50. Thus, the processing of the processor 61 proceeds from ACT92 to ACT99. In ACT99, the processor 61 causes the touch panel 21 to display an image for notifying the customer of the fact that deposit of money into the automated change machine is unacceptable, similarly to ACT28 in the first embodiment. Further, in ACT100, the processor 61 acquires the change amount from the transaction data. Subsequently, the processing of the processor 61 proceeds to ACT96. The processor 61 then executes the processing from ACT96 to ACT98 in a similar manner as described above. In other words, if the change amount is a positive value, the processor 61 controls the change machine interface 66 to output change data for instructing the automated change machine 20 to pay out the change. By such control, the change data is transmitted from the change machine interface 66 to the automated change machine 20, and money corresponding to the change amount is paid out from the automated change machine 20. The money is the domestic currency. If the change amount is "0", the processor 61 does not perform the processing of outputting the change data to the automated change machine 20. Subsequently, the processor 61 controls issue of a receipt. Through such operations, the processor 61 terminates the processing when the transaction data with the completion flag of "1" is received.

As described above, similarly to the settlement apparatus 10 of the first embodiment, the semi-self-service POS system 100 can handle not only the payment in the domestic currency as a first currency but also the payment in the foreign currency as a second currency. Besides, if change is generated for the payment in the foreign currency, the change is paid out in the domestic currency from the automated change machine 20. In such a manner, it is unnecessary to pay out the change in the foreign currency, so that the current automated change machine 20 included in the checkout machine 60 can be utilized as it is.

Hereinabove, the embodiments of the settlement apparatus have been described, but embodiments thereof are not limited thereto.

For example, the rate used for converting the settlement amount calculated in the unit of the first currency into the settlement amount in the unit of the second currency by the first converting means 113 or the first converting means 513 may be different from the rate used for converting the payment amount in the unit of the second currency into the payment amount in the unit of the first currency by the second converting means 116 or the second converting means 516.

For example, the customer display 25 may be used as a touch panel, and a customer may perform an input with a soft key of the currency selection screen.

The input device for inputting the amount of money may be the touch panel 21.

The action for inhibiting money from being inserted into the automated change machine 20 is not limited to the action of outputting a message for inhibiting money from being inserted in an official language of the countries or regions where the foreign currency is circulated. For example, it may be possible to automatically close the bill inserting port and the coin inserting port of the automated change machine 20 and physically prevent money from being inserted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A settlement apparatus, comprising:
a rate table that stores an exchange rate between a first currency and a second currency;
a first settlement amount memory that stores a settlement amount in the first currency;
a second settlement amount memory that stores a settlement amount in the second currency;
a payment amount memory that stores a payment amount for the settlement amount;
a difference amount memory that stores an amount of difference between the settlement amount and the payment amount;
an automated change machine;
a display; and
a processor configured to
refer to the rate table to acquire a rate for exchanging the first currency to the second currency,
calculate the settlement amount in the first currency to store the calculated settlement amount in the first currency in the first settlement amount memory,
convert the settlement amount in the first currency, which is stored in the first settlement amount memory, into the settlement amount in the second currency by using the acquired rate, to store the converted settlement amount in the second currency in the second settlement amount memory,
acquire the payment amount in the second currency to store the payment amount in the second currency in the payment amount memory,
calculate an amount of difference between the settlement amount in the second currency, which is stored in the second settlement amount memory, and the payment amount in the second currency stored in the payment amount memory, to store the calculated amount of difference in the second currency in the difference amount memory, convert the payment amount in the second currency, which is stored in the payment amount memory, into the payment amount in the first currency by using the acquired rate, and compute an amount of difference between the converted payment amount in the first currency and the settlement amount stored in the first settlement amount memory, to store the computed amount of difference in the first currency in the difference amount memory, in response to determining that the payment amount in the second currency is smaller than the settlement amount in the second currency, control the display to display a message indicating the amount of the difference in the second currency, which is stored in the difference amount memory, as a short amount, and in response to determining that the payment amount in the second currency is equal to or larger than the settlement amount in the second currency, control the automated change machine to dispense cash in the amount of difference in the first currency, which is stored in the difference amount memory, as a change amount.

2. The settlement apparatus according to claim 1, wherein the difference amount memory includes
   a short amount memory that stores, if the payment amount in the second currency is smaller than the settlement amount in the second currency, the amount of difference between the payment amount in the second currency and the settlement amount in the second currency, and
   a change amount memory that stores, if the payment amount in the second currency is equal to or larger than the settlement amount in the second currency, the amount of difference between the payment amount in the first currency and the settlement amount in the first currency.

3. The settlement apparatus according to claim 2, wherein if the payment amount in the second currency is smaller than the settlement amount in the second currency, the processor outputs the amount of difference in the second currency, which is stored in the short amount memory.

4. The settlement apparatus according to claim 2, wherein if the payment amount in the second currency is equal to or larger than the settlement amount in the second currency, the processor outputs the amount of difference in the first currency, which is stored in the change amount memory.

5. The settlement apparatus according to claim 1, further comprising
   an input device with which an amount of money is input, wherein
   the processor
      acquires the amount of money, which is input via the input device, as the payment amount in the second currency,
      acquires an amount of money inserted into the automated change machine as the payment amount in the first currency, and
      performs, when acquiring the payment amount in the second currency, an action for inhibiting money from being inserted into the automated change machine.

6. The settlement apparatus according to claim 5, wherein
   the first currency is a domestic currency,
   the second currency is a foreign currency, and
   the action for inhibiting money from being inserted into the automated change machine includes an action for displaying on the display a message for inhibiting money from being inserted in an official language of a country or region where the foreign currency is circulated.

7. A settlement method for a settlement apparatus, comprising:
   storing an exchange rate between a first currency and a second currency in a rate table;
   referring to the rate table to acquire a rate for exchanging the first currency to the second currency;
   calculating a settlement amount in the first currency to store the calculated settlement amount in the first currency in a first settlement amount memory;
   converting the settlement amount in the first currency, which is stored in the first settlement amount memory, into a settlement amount in the second currency by using the acquired rate, to store the converted settlement amount in the second currency in a second settlement amount memory;
   acquiring a payment amount in the second currency to store the payment amount in the second currency in a payment amount memory;
   calculating an amount of difference between the settlement amount in the second currency, which is stored in the second settlement amount memory, and the payment amount in the second currency stored in the payment amount memory, to store the calculated amount of difference in the second currency in the difference amount memory;
   converting the payment amount in the second currency, which is stored in the payment amount memory, into the payment amount in the first currency by using the acquired rate, and computing an amount of difference between the converted payment amount in the first currency and the settlement amount stored in the first settlement amount memory, to store the computed amount of difference in the first currency in the difference amount memory;
   in response to determining that the payment amount in the second currency is smaller than the settlement amount in the second currency, displaying on a display a message indicating the amount of the difference in the second currency, which is stored in the difference amount memory, as a short amount, and
   in response to determining that the payment amount in the second currency is equal to or larger than the settlement amount in the second currency, dispensing from an automated change machine cash in the amount of difference in the first currency, which is stored in the difference amount memory, as a change amount.

8. The settlement apparatus according to claim 1, further comprising:
   a cash drawer, wherein
   the processor is configured to cause the cash drawer to be opened when payment in the second currency is processed and not to be opened when payment in the first currency is processed.

* * * * *